US012586118B2

(12) United States Patent
Saunkeah

(10) Patent No.: US 12,586,118 B2
(45) Date of Patent: Mar. 24, 2026

(54) SYSTEMS AND METHODS FOR SURPRISE OBJECT DISTRIBUTION

(71) Applicant: SYNCHRONY BANK, Stamford, CT (US)

(72) Inventor: Gabriel Saunkeah, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 1 day.

(21) Appl. No.: 18/443,505

(22) Filed: Feb. 16, 2024

(65) Prior Publication Data

US 2024/0289860 A1      Aug. 29, 2024

Related U.S. Application Data

(60) Provisional application No. 63/486,837, filed on Feb. 24, 2023.

(51) Int. Cl.
G06Q 30/0601 (2023.01)
G06Q 30/0204 (2023.01)
G06Q 10/087 (2023.01)
G06Q 20/20 (2012.01)

(52) U.S. Cl.
CPC ..... G06Q 30/0631 (2013.01); G06Q 30/0205 (2013.01); *G06Q 10/08741* (2025.08); *G06Q 20/203* (2013.01)

(58) Field of Classification Search
CPC ........... G06Q 30/0631; G06Q 30/0205; G06Q 20/203; G06Q 10/08741
See application file for complete search history.

(56) References Cited

U.S. PATENT DOCUMENTS

2009/0254453 A1* 10/2009 Sanguinetti ........ G06Q 30/0601
                                              705/26.1
2011/0246284 A1* 10/2011 Chaikin ............. G06Q 30/0207
                                              705/14.1

(Continued)

OTHER PUBLICATIONS

C. Huang et al., "Research on recommendation systems in the electronic commerce," 2018 Chinese Control and Decision Conference (CCDC), Shenyang, China, 2018, pp. 1476-1481.*

(Continued)

*Primary Examiner* — Timothy Padot
(74) *Attorney, Agent, or Firm* — Polsinelli LLP

(57) ABSTRACT

Systems and methods are provided for generating surprise gift objects presentable to intended recipients based on real-time location data associated with recipients. Users are provided with recommendations for surprise gift objects that can be provided to recipients based on information associated with recipients and inventory data associated with locations through which options associated with these surprise gift objects are made available. Through these systems and methods, recipients are notified of the availability of surprise gift objects based on their real-time location data. As recipients select different options associated with these surprise gift objects or otherwise redeem these surprise gift objects at the one or more locations, data corresponding to these redemptions is used to further enhance the systems and methods in order to provide more accurate tailored recommendations to users wishing to send surprise gift objects to recipients and to the recipients when redeeming surprise gift objects.

21 Claims, 11 Drawing Sheets

(56)                    References Cited

U.S. PATENT DOCUMENTS

| | | | |
|---|---|---|---|
| 2011/0313874 A1* | 12/2011 | Hardie ................. | G06Q 20/306 |
| | | | 705/26.1 |
| 2016/0335709 A1* | 11/2016 | Salvatore ............. | H04W 4/029 |
| 2019/0325691 A1* | 10/2019 | Tovey .................... | G07F 17/12 |
| 2020/0294110 A1* | 9/2020 | Sirota ................ | G06Q 30/0603 |
| 2022/0051513 A1* | 2/2022 | Schmidt ............ | G07C 9/00571 |

OTHER PUBLICATIONS

Y. H. Liu, et al., "A Model-Driven SOA Implementation of Multi-Channel Websphere Commerce Gift Center," 2008 IEEE International Conference on e-Business Engineering, Xi'an, China, 2008, pp. 29-34.*
J. Li, I. Ari, J. Jain, A. H. Karp and M. Dekhil, "Mobile In-store Personalized Services," 2009 IEEE International Conference on Web Services, Los Angeles, CA, USA, 2009, pp. 727-734.*

* cited by examiner

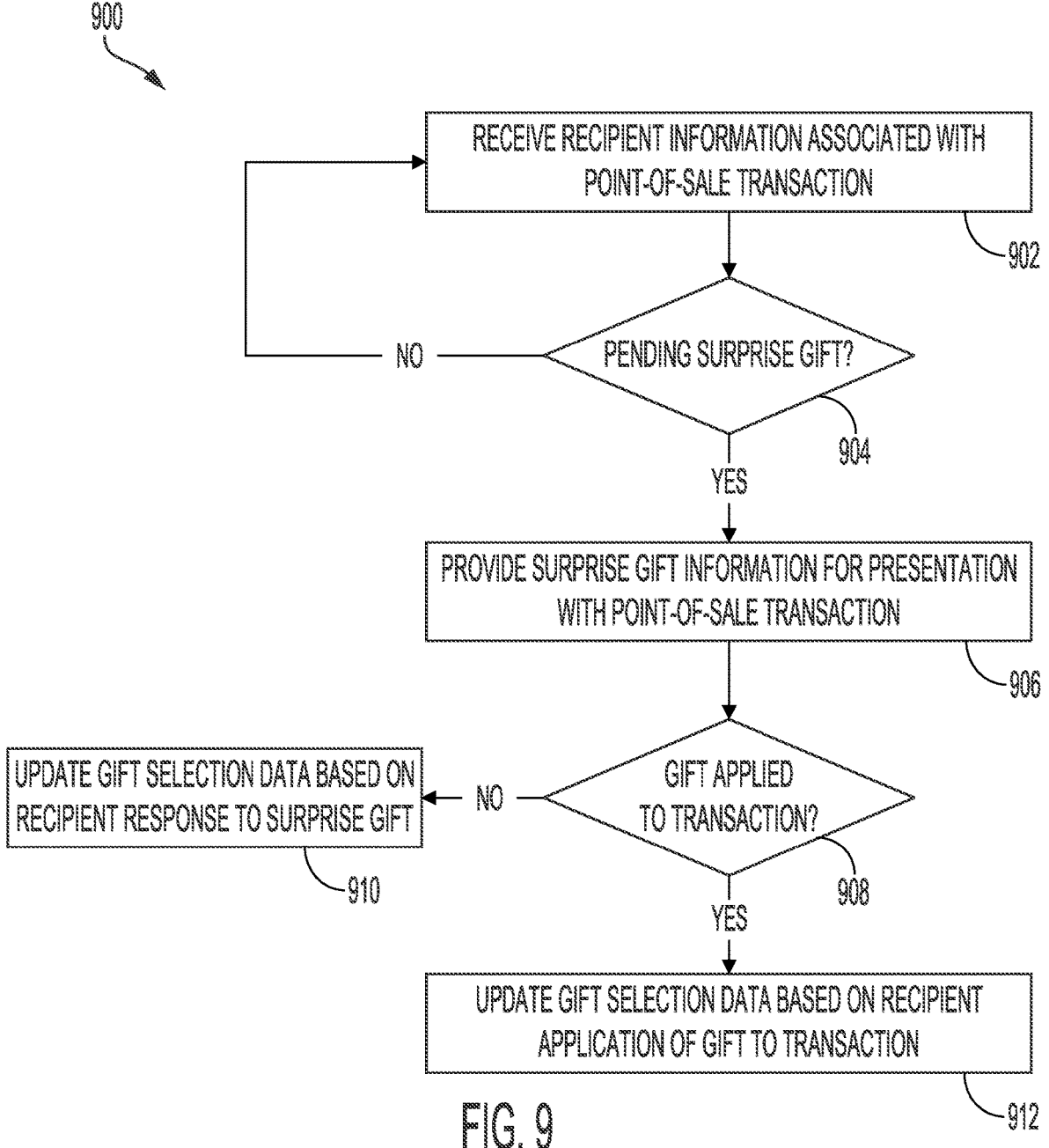

900

RECEIVE RECIPIENT INFORMATION ASSOCIATED WITH
POINT-OF-SALE TRANSACTION
902

PENDING SURPRISE GIFT?
904

NO

YES

PROVIDE SURPRISE GIFT INFORMATION FOR PRESENTATION
WITH POINT-OF-SALE TRANSACTION
906

UPDATE GIFT SELECTION DATA BASED ON
RECIPIENT RESPONSE TO SURPRISE GIFT
910

NO

GIFT APPLIED
TO TRANSACTION?
908

YES

UPDATE GIFT SELECTION DATA BASED ON RECIPIENT
APPLICATION OF GIFT TO TRANSACTION
912

FIG. 9

SYSTEMS AND METHODS FOR SURPRISE OBJECT DISTRIBUTION

CROSS-REFERENCE TO RELATED APPLICATIONS

The present patent application claims the priority benefit of U.S. provisional patent application No. 63/486,837 filed Feb. 24, 2023, the disclosures of which are incorporated by reference herein.

FIELD

The present disclosure relates to systems and methods for generating surprise gift objects presentable to recipients based on location data obtained from recipient devices and from various retailer systems associated with one or more locations through which the surprise gift objects are made available.

SUMMARY

Disclosed embodiments provide a framework for generating surprise gift objects presentable to intended recipients based on real-time location data associated with the recipients. According to some embodiments, a computer-implemented method is provided. The computer-implemented method comprises receiving a request to generate a surprise gift object. The request includes identifying information associated with a recipient. Further, the request defines one or more locations through which the surprise gift object is to be made available. The computer-implemented method further comprises automatically generating a set of recommendations corresponding to different gift selection options for defining the surprise gift object. The set of recommendations are generated based on the identifying information associated with the recipient. The computer-implemented method further comprises providing the set of recommendations. The computer-implemented method further comprises receiving a set of gift selection options presentable at the one or more locations for the surprise gift object. The set of gift selection options are received based on the set of recommendations. The computer-implemented method further comprises detecting, in real-time, recipient access to a location associated with the one or more locations. The computer-implemented method further comprises transmitting a notification to indicate an availability of the surprise gift object such that when the notification is received by a recipient device, the notification is presented. The computer-implemented method further comprises making available the set of gift selection options through the location such that when a gift selection option is selected, an indication that the surprise gift object has been delivered is provided.

In some embodiments, the set of gift selection options are provided through a surprise gift object storage device. Further, the indication is associated with the surprise gift object storage device.

In some embodiments, the computer-implemented method further comprises automatically detecting a newly unavailable gift selection option from the set of gift selection options. The computer-implemented method further comprises transmitting a new notification to indicate remaining gift selection options from the set of gift selection options.

In some embodiments, detecting the recipient access to the location includes obtaining, in real-time, location data corresponding to the recipient device. Further, detecting the recipient access to the location includes determining that the recipient device is in proximity of the location based on the location data.

In some embodiments, the request further defines a range of dates during which the surprise gift object is to be available. Further, the notification is transmitted as a result of the recipient access occurring within the range of dates.

In some embodiments, the computer-implemented method further comprises obtaining inventory information associated with the one or more locations. The computer-implemented method further comprises updating the set of recommendations according to the inventory information.

In some embodiments, the computer-implemented method further comprises providing an option to convert the surprise gift object to a monetary value. The option is provided through the notification.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

FIG. 9 shows an illustrative example of a process for providing a surprise gift object through one or more point-of-sale systems in real-time during a transaction associated with a surprise gift object recipient in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to generate surprise gift objects that are presentable to intended recipients based on real-time location data associated with the intended recipients. Through this framework, a gifting distribution system can provide users with recommendations for surprise gift objects that can be provided to recipients based on information associated with these recipients and inventory data associated with one or more locations through which gifts associated with these surprise gift objects may be made available. Further, through this framework, recipients can be notified, in real-time, of the availability of surprise gift objects based on their real-time location data. As recipients select gifts associated with these surprise gift objects or otherwise redeem these surprise gift objects at the one or more locations, data corresponding to these redemptions is used to further enhance the gifting distribution system in order to provide more accurate tailored recommendations to users wishing to send surprise gift objects to recipients and to the recipients themselves when redeeming the surprise gift objects.

Figure 1:
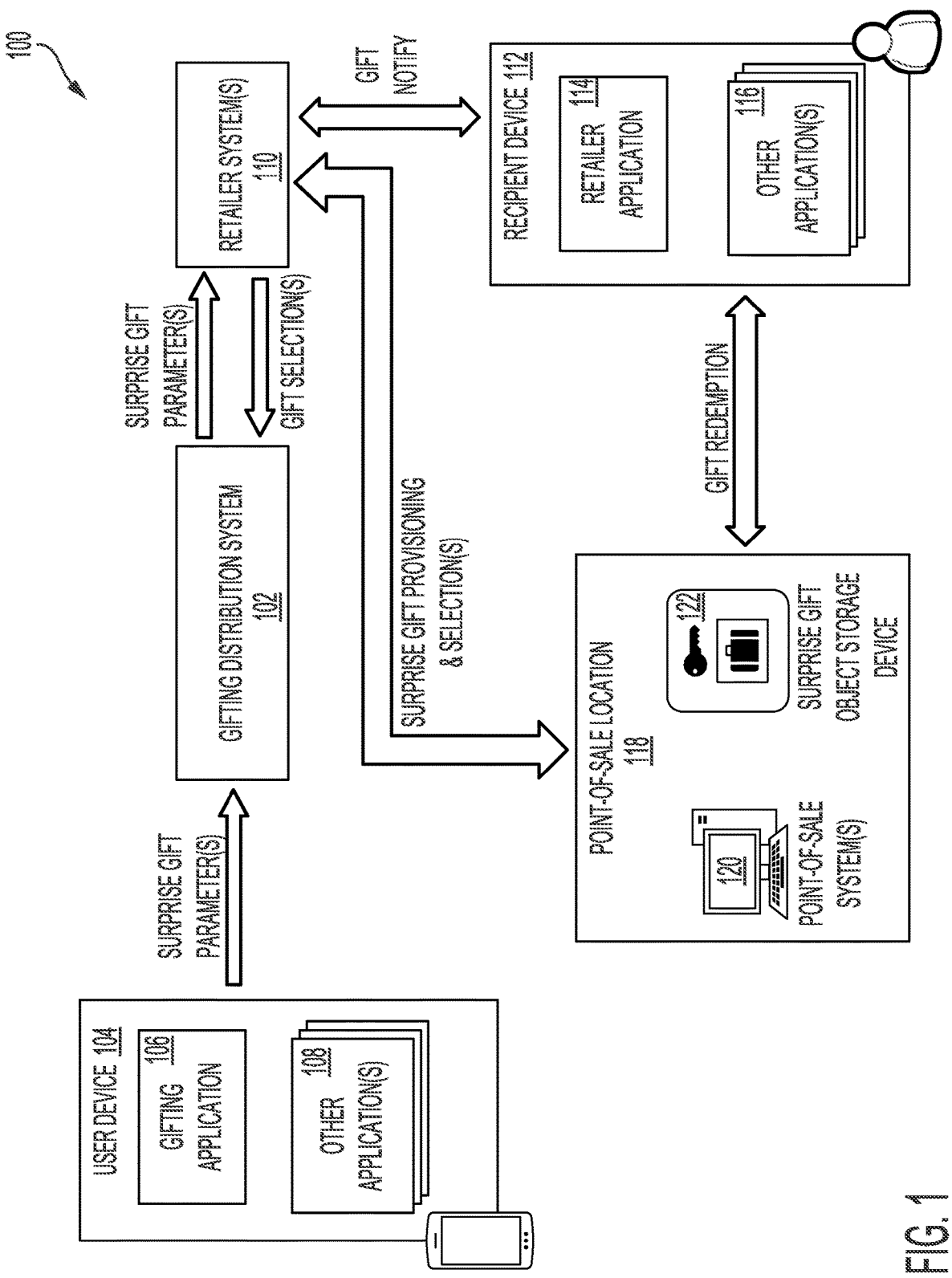
FIG. 1 shows an illustrative example of an environment in which a surprise gift object is generated for redemption at a location based on detection of an intended recipient of the surprise gift object at the location in accordance with at least one embodiment.

FIG. 1 shows an illustrative example of an environment 100 in which a surprise gift object is generated for redemption at a point-of-sale location 118 based on detection of an intended recipient 112 of the surprise gift object at the point-of-sale location 118 in accordance with at least one embodiment. In the environment 100, a gifting distribution system 102 provides, to a user device 104 through a gifting application 106 and/or one or more other applications 108 implemented on the user device 104, one or more options for generating a surprise gift object that can be presented to a particular recipient (such as through the recipient's computing device 112) based on one or more parameters. For instance, a user, through their user device 104, can execute a gifting application 106 that can be utilized to generate a surprise gift object that can be distributed to a particular recipient as designated by the user of the user device 104 according to the one or more parameters defined by the user. For example, through the gifting application 106, a user may define one or more parameters whereby an indication of a surprise gift object is to be automatically presented to the recipient when the recipient enters a particular point-of-sale location 118 associated with a particular retailer or other entity. As another illustrative example, through the gifting application 106, the user may define one or more parameters whereby an indication of the surprise gift objects is to be automatically presented to the recipient when the recipient engages one or more point-of-sale systems 120 (e.g., a self-checkout device, a kiosk at the point-of-sale location 118, etc.). As described in greater detail herein, the one or more parameters may thus define a set of criteria whereby, if satisfied, may cause the gifting distribution system 102 or one or more retailer systems 110 to automatically, and in real-time, indicate that a surprise gift object is available to the recipient.

The gifting distribution system 102 may be implemented to allow the user (e.g., a purchaser, a sender, etc.) to purchase a surprise gift object for a recipient using a variety of techniques such as those described herein. For example, as noted above, the gifting distribution system 102 may implement a gifting application 106 that may be installed on the user device 104 and other devices to allow users to purchase a surprise gift object for particular recipients and to define one or more parameters corresponding to different criteria for when the surprise gift object is to be presented to these particular recipients. In some instances, the gifting distribution system 102 may be accessed or otherwise integrated with one or more applications 108 through which a user may purchase a surprise gift object and to define the one or more parameters for when the surprise gift object is to be presented to a particular recipient. For example, the one or more other applications 108 may include a retailer application associated with a particular retailer through which surprise gift objects may be provided to recipients. The particular retailer may maintain one or more point-of-sale locations (such as point-of-sale location 118) through which surprise gift objects may be made available to particular recipients. For instance, the retailer, through a point-of-sale location 118, may maintain one or more surprise gift object storage devices 122 through which surprise gift objects may be made available to recipients, as described in greater detail herein. Additionally, or alternatively, the retailer may maintain various point-of-sale systems 120 that may automatically communicate with one or more retailer systems 110 and/or the gifting distribution system 102 to determine whether an entity engaging with the point-of-sale systems 120 is associated with a surprise gift object that may be provided to the entity at the point-of-sale location 118. In an embodiment, the one or more surprise gift object storage devices 122 are maintained by a third-party entity that is distinct from the retailer associated with the point-of-sale location 118. For instance, a third-party entity may obtain authorization from a retailer that implements a point-of-sale location 118 to install one or more surprise gift object storage devices 122 at the point-of-sale location 118 and through which the third-party entity may make surprise gift objects available to recipients, as described in greater detail herein. In some instances, the surprise gift object storage devices 122 may be implemented by the gifting distribution system 102 itself, whereby the gifting distribution system 102 may allow for distribution of surprise gift objects obtained through the gifting distribution system 102 or other entity associated with the gifting distribution system 102 via the surprise gift object storage devices 122.

In an embodiment, the gifting distribution system 102 is further implemented to allow other entities to generate and provide surprise gift objects to recipients. For example, the gifting distribution system 102 may allow a retailer to provision a surprise gift object that may be provided to a recipient when the recipient enters a point-of-sale location associated with this retailer or other location through which the retailer may make the surprise gift object available (e.g., a location through which a surprise gift object storage device is implemented, etc.). For instance, the retailer may access the gifting distribution system 102 to provide a surprise gift object to a particular recipient based on a retailer-specific recipient milestone (e.g., the recipient has been a customer of the retailer for a particular period of time, the recipient has earned a certain number of loyalty rewards points with the retailer, the recipient has spent a pre-requisite amount over time at point-of-sale locations associated with the retailer, etc.). In some instances, the retailer may access the gifting distribution system 102 to provide surprise gift objects to any customers within vicinity of a particular point-of-sale system as part of promotional campaign, whereby these customers may be enticed to enter the point-of-sale location as these customers enter within a particular radius of the point-of-sale location. As their enter this radius, these potential customers may be notified of the availability of a surprise gift object at the point-of-sale location.

In an embodiment, the gifting distribution system 102, through the gifting application 106 and/or through the other applications 108, can provide a framework to identify surprise gift object categories, curate surprise gift objects, present surprise gift object alternatives (e.g., surprise gift objects other than those originally selected for a recipient, cash equivalents, gift cards, etc.), coordinate surprise gift object fulfilment, generate surprise gift object options, and provide other services related to surprise gift objects, surprise gift object options, and/or surprise gift object fulfilment. In an embodiment, the gifting distribution system 102 can provide systems and methods such as those described herein to generate a predictive model for surprise gift object fulfillment for a specified recipient. For instance, the gifting distribution system 102 can provide systems and methods such as those described herein to update the predictive model of the recipient based on surprise gift object options, surprise gift object selections, known or predicted demographics of the recipient, seasonal and/or other events, and other such factors. In an embodiment, the gifting distribution system 102 can provide systems and methods such as those described herein to use those predictive models to generate surprise gift object options for the user that would like to send a surprise gift object to a recipient and/or for the recipient of the surprise gift object.

In an embodiment, the user, though their user device 104 or other device through which surprise gift objects may be defined (e.g., a point-of-sale system 120, a system associated with a particular retailer or set of retailers, a system associated with the gifting distribution system 102, etc.), may submit a surprise gift object request to generate a new surprise gift object that may be provided to a particular recipient based on one or more defined parameters. The user device 104 may be a laptop computer, a desktop computer, a smartphone, a tablet, a smart watch, or some other such computing device such as those described herein. As illustrated in FIG. 1, the user may submit the surprise gift object request to the gifting distribution system 102 using a gift application 106 provided by the gifting distribution system 102 and installed onto the user device 104. In an embodiment, the user can submit the surprise gift object request to the gifting distribution system 102 using a web service maintained by the gifting distribution system 102. For instance, through a browser application implemented on the user device 104, the user may access a web service maintained by the gifting distribution system 102 (e.g., a website, etc.) through which the user may defined the surprise gift object that is to be provided to a particular recipient subject to one or more parameters defined by the user. As noted above, in some instances, the user may submit the surprise gift object request to the gifting distribution system 102 using one or more other applications implemented on the user device 104, such as through an application provided by retailer that may make the surprise gift object available on behalf of the gifting distribution system 102 to intended recipients.

In an embodiment the surprise gift object parameters can indicate the time, place, and manner in which a surprise gift object is to be provided to an intended recipient. For example, through a gifting application 106 or other application 108, a user may define a surprise gift object parameter whereby the selected surprise gift object is to be provided to the recipient at a particular point-of-sale location 118 that the recipient may often frequent. As an illustrative example, if the user knows that the recipient often visits the same point-of-sale location 118 associated with a particular retailer, the user may define a surprise gift object parameter the gifting distribution system 102 and/or a retailer system 110 associated with the point-of-sale location 118 may indicate, to the recipient, that a surprise gift object is available to the recipient at the point-of-sale location 118. The notification to the recipient (as described in greater detail herein) may be provided without indication of what the actual gift selected by the user is such that the recipient may be required to go to the point-of-sale location 118 to retrieve the actual gift purchased by the user for the recipient. In some instances, the user, through the gifting application 106 or other application 108, may define a surprise gift object parameter whereby the selected surprise gift object is to be provided to the recipient through a surprise gift object storage device 122 implemented at a point-of-sale location 118. As noted above, this surprise gift object storage device 122 may be associated with a third-party entity that is distinct from a retailer or other entity that maintains the point-of-sale location 118. Alternatively, the surprise gift object storage device 122 may be implemented by the gifting distribution system 102 itself. Thus, the user may define a surprise gift object that may be provided by a third-party entity or the gifting distribution system 102 through a surprise gift object storage device 122 that is not implemented by a retailer or other entity that maintains the point-of-sale location 118 where the surprise gift object storage device 122 is located.

In some instances, the user may define a surprise gift object parameter that may serve as an indication of the manner in which the surprise gift object is to be made available to the recipient at a point-of-sale location 118. For example, if the user defines a surprise gift object that includes a set of gifts from which a recipient may make a selection from the set of gifts, the user may define a surprise gift object parameter whereby the set of gifts may be stored at a point-of-sale location 118 within a surprise gift object storage device 122. The surprise gift object storage device 122, in an embodiment, can include one or more secure lockers or other container that may be used to store different items, including gifts, that may be made available to intended recipients. For example, a surprise gift object storage device 122 may include one or more security mechanisms whereby the contents of the surprise gift object storage device 122 are secured and retrievable only by authorized entities (e.g., entities associated with the point-of-sale location 118, entities associated with the gifting distribution system 102 or other third-party system that implements the surprise gift object storage device 122, intended recipients, etc.). As described in greater detail herein, when a recipient accesses the surprise gift object storage device 122, the recipient may be presented with the set of gifts selected by the user for presentation to the recipient. The recipient may review this set of gifts and select one or more of the gifts as the surprise gift object provided by the user. Thus, the recipient may be made aware of the availability of the surprise gift object but may not know what gifts are available to the recipient until they access the surprise gift object storage device 122 at the point-of-sale location 118.

In another illustrative example, the user may define a surprise gift object parameter whereby the surprise gift object is to be automatically presented to the recipient when the recipient engages one or more point-of-sale systems 120 at a point-of-sale location 118. For instance, the user, through the gifting application 106 or other application 108 implemented on the user device 104, may indicate that the surprise gift object is to be presented to the recipient when the recipient engages a self-checkout device at any point-of-sale location associated with a particular retailer. For example, if the recipient, through a self-checkout device, provides recipient identifying information (e.g., recipient name, recipient electronic address, recipient physical address, loyalty rewards information, payment information, etc.) that may be used to uniquely identify the recipient, the self-checkout device may query the gifting distribution system 102 and/or one or more retailer systems 110 associated with the self-checkout device to determine whether a surprise gift object is associated with the provided recipient. If so, the self-checkout device may automatically, and in real-time, provide the recipient with an indication of the surprise gift object purchased by the user for the recipient. As another illustrative example, if the one or more point-of-sale systems 120 are used by a retailer employee (e.g., customer service associate, counter associate, etc.), when the retailer employee input any provided recipient identifying information on behalf of a recipient, the one or more point-of-sale systems 120 may query the gifting distribution system 102 and/or one or more retailer systems 110 to determine whether a surprise gift object is associated with the provided recipient. If a surprise gift object is available, the one or more point-of-sale systems 120 may prompt the retailer employee to indicate the availability of the surprise gift object. Alternatively, if the one or more point-of-sale systems 120 are implemented with one or more interface devices accessible to the recipient (e.g., screens, user interfaces, etc.), the one or more point-of-sale systems 120 may automatically update the one or more interface devices to present the surprise gift object to the recipient without further retailer employee intervention.

In some instances, the user may define a surprise gift object parameter whereby an indication of the surprise gift object is to be automatically presented to the recipient at a particular time. For instance, if the surprise gift object is being purchased for the recipient's birthday, the user may define a surprise gift object parameter corresponding to the recipient's birthday. This may cause the gifting distribution system 102 and/or the one or more retailer systems 110 to provide an indication to the recipient of the available of the surprise gift object on or around the recipient's birthday (e.g., within a time range before and/or after the recipient's birthday, etc.). As an illustrative example, if the user indicates that the surprise gift object is to be made available within a particular time range (e.g., within a week, with two weeks, etc.) of a recipient's birthday at a particular point-of-sale location 118, the gifting distribution system 102 and/or the one or more retailer systems 110 associated with the point-of-sale location 118 may begin monitoring the point-of-sale location 118 at the earliest possible date (e.g., the beginning of the particular time range, the recipient's birthday, etc.) to determine whether the recipient has arrived at the point-of-sale location 118. For instance, if the recipient interacts with one or more point-of-sale systems 120 at the point-of-sale location 118 within the defined particular time range, the gifting distribution system 102 and/or the one or more retailer systems 110 may transmit a set of executable instructions that, as a result of being executed by the one or more point-of-sale systems 120, may cause the one or more point-of-sale systems 120 to provide the recipient with an indication of the surprise gift object. However, if the recipient interacts with one or more point-of-sale systems 120 at the point-of-sale location 118 outside of the particular time range, the gifting distribution system 102 and/or one or more retailer systems 110 may forego the transmission of the aforementioned executable instructions for presentation of the surprise gift object to the recipient at the point-of-sale location 118.

In an embodiment, the gifting distribution system 102 implements one or more machine learning algorithms or artificial intelligence that are dynamically trained to provide users with recommendations corresponding to surprise gift objects that may be provided to particular recipients, as well as recommendations corresponding to different surprise gift object parameters that may be associated with these surprise gift objects and used to determine when and how the surprise gift objects are to be presented to recipients. For instance, the gifting distribution system 102 may implement a clustering algorithm that is dynamically trained to identify similar surprise gift object requests and similar recipient profiles based on one or more vectors (e.g., age, geographic location, other demographic information, other provided information, etc.). In some embodiments, the gifting distribution system 102 can perform such clustering and obtain partial matches among other recipient profiles and/or other surprise gift object requests according to these one or more vectors. In some instances, a dataset of recipient profiles and/or other surprise gift object requests corresponding to other surprise gift object requests may be analyzed using a clustering algorithm to identify different types of recipient profiles and/or other surprise gift object requests associated with the gifting distribution system 102.

Example clustering algorithms that may trained using sample recipient profiles (e.g., recipient profiles corresponding to historical recipients of surprise gift objects, hypothetical recipient profiles corresponding to hypothetical surprise gift object requests, etc.), and/or sample surprise gift object requests (e.g., actual historical surprise gift object requests, hypothetical surprise gift object requests, etc.) datasets to analyze the surprise gift object request and/or the profiles of the indicated recipient so as to determine various aspects of the surprise gift object request. The example clustering algorithms may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of these algorithms, the gifting distribution system 102 may determine the various aspects of the surprise gift object request.

When a user, such as through a gifting application 106 or other application 108, accesses the gifting distribution system 102 to define a surprise gift object that may be provided to a recipient subject to one or more surprise gift object parameters, the gifting distribution system 102 may prompt the user to provide identifying information corresponding to the recipient (e.g., recipient name, recipient electronic address, recipient physical address, etc.) and any surprise gift object parameters that are to be associated with the new surprise gift object. A surprise gift object parameter, as described above, may include an indication of one or more times and/or time ranges during which the surprise gift object may be available to the recipient at one or more point-of-sale locations 118. Additionally, or alternatively, a surprise gift object parameter may include an indication of the one or more locations at which a surprise gift object may be presented to a recipient. For example, if the user selects a particular retailer that is to make the surprise gift object available to the recipient, the user may be prompted by the gifting distribution system 102 to select one or more point-of-sale locations 118 associated with the particular retailer through which the recipient may be presented with and receive their surprise gift object. In some instances, if the selected retailer implements or is otherwise associated with surprise gift object storage devices 122 implemented at point-of-sale locations 118 that are not associated with the retailer, the gifting distribution system 102 may further provide the user with options corresponding to these one or more point-of-sale locations 118 where the surprise gift object storage devices 122 are implemented. In some instances, the gifting distribution system 102 may automatically process any provided recipient information to generate one or more recommendations corresponding to specific point-of-sale locations 118 that may be used to make the surprise gift object available to the recipient. For example, if the recipient resides in Topeka, Kansas, United States and the user has selected a particular retailer that is to make the surprise gift object available to the recipient, the gifting distribution system 102 may automatically query the one or more retailer systems 110 associated with the particular retailer to identify any point-of-sale locations 118 within geographic proximity of the recipient's residence in Topeka, Kansas, United States. These point-of-sale locations 118 may correspond to "brick and mortal" locations operated by the retailer, through which the retailer may implement one or more point-of-sale systems 120 and/or surprise gift object storage devices 122 through which surprise gift objects may be made available. Additionally, or alternatively, these point-of-sale locations 118 may correspond to locations that may be associated with other retailers or entities but where the particular retailer maintains or is otherwise associated with different surprise gift object storage devices 122 implemented at these locations. These point-of-sale locations 118 may be presented to the user for selection as one or more surprise gift object parameters for presentation of the surprise gift object.

In an embodiment, the gifting distribution system 102 can use the obtained recipient information as input to one or more machine learning algorithms or artificial intelligence to provide the user with various surprise gift object recommendations that may be presented to the user. These various surprise gift object recommendations may correspond to different gifts that may be made available through one or more point-of-sale locations 118 associated with one or more retailers or other entities as surprise gift objects for different recipients. For example, if the user provides, through the gifting application 106 or other application 108 implemented on their user device 104, information corresponding to the intended recipient of the surprise gift object and indicates a particular retailer (e.g., through use of a retailer-specific application, as indicated through the gifting application 106, etc.) that is to make the surprise gift object available to the intended recipient, the gifting distribution system 102 may identify the available gift inventory associated with the particular retailer and corresponding to the defined surprise gift object parameters. For instance, based on the geographic location of the recipient and/or on the particular point-of-sale locations 118 selected by the user, the gifting distribution system 102 may query the one or more retailer systems 110 associated with the particular retailer to identify the available product inventory at the point-of-sale locations 118 associated with the geographic location of the recipient and/or selected by the user in their surprise gift object request. In some instances, if the particular retailer implements or is otherwise associated with one or more surprise gift object storage devices 122 implemented at point-of-sale locations 118 not managed by the particular retailer (e.g., the point-of-sale locations 118 are associated with a different retailer, the point-of-sale locations 118 correspond to locations outside of a retail setting (e.g., train stations, schools, gyms, etc.), etc.), the gifting distribution system 102 may query the one or more retailer systems 1110 associated with the selected retailer to identify available products that the retailer may make available through the surprise gift object storage devices 122 implemented at the point-of-sale locations 118.

As noted above, the gifting distribution system 102 may implement one or more machine learning algorithms and/or artificial intelligence that may be dynamically trained to provide users with surprise gift object recommendations that may corresponding to different gifts that may be presented to a recipient as a surprise gift object at one or more point-of-sale locations 118. In an embodiment, the gifting distribution system 102 uses the provided recipient information, surprise gift object parameters, and information corresponding to the available product inventory at the identified point-of-sale locations 118 (including inventory that is deliverable to surprise gift object storage devices 122 within the point-of-sale locations 118 from other locations associated with different retailers) as input to the one or more machine learning algorithms and/or artificial intelligence to generate a set of surprise gift object recommendations that may be provided to the user. The surprise gift object recommendations may include different products that may be selected and used to generate surprise gift objects for the recipient. Further, since the available product inventory is used as input to the one or more machine learning algorithms and/or artificial intelligence, the resulting set of surprise gift object recommendations may correspond to products that are available at the one or more point-of-sale locations 118 or that otherwise may be delivered and stored within one or more surprise gift object storage devices 122 at the one or more point-of-sale locations 118 associated with the surprise gift object request.

In some instances, the gifting distribution system 102 may provide the user with the set of surprise gift object recommendations if the user has not previously selected or defined a set of products or items that may be presented to the intended recipient for selection as a surprise gift object at the one or more point-of-sale locations 118. For instance, the surprise gift object request may include information received from the user about, for example, the recipient but may be devoid of any defined set of surprise gift object selection options. For example, the user may specify who the recipient is and may specify some aspects of the surprise gift object within the surprise gift object request. These aspects may include the price or type of the surprise gift object, as described in detail herein, and the particular retailer and/or particular point-of-sale locations 118 through which the surprise gift object is to be made available to the recipient.

As an illustrative example, if the user indicates, in the surprise gift object request, that the intended recipient is a parent to a newborn child and that the intended recipient resides in Topeka, Kansas, United States, the gifting distribution system 102 may use this information as input to the aforementioned one or more machine learning algorithms or artificial intelligence to identify one or more clusters of similarly-situated recipients to which surprise gift objects have been provided. For instance, the gifting distribution system 102 may automatically, and in real-time, assign values corresponding to the recipient along one or more vectors (e.g., the recipient's age, the recipient's Topeka address, the recipient's status as a new parent, etc.). In some embodiments, the gifting distribution system 102 can perform such clustering and obtain partial matches among other recipient profiles and/or other surprise gift object requests according to these values along the one or more vectors implemented for clustering similarly-situated recipients.

In some instances, the output of the one or more machine learning algorithms or artificial intelligence may include one or more product types or categories from which a user may select a set of products or items that may be presented to a recipient as possible surprise gift objects at one or more point-of-sale locations 118. Returning to the aforementioned example corresponding to a recipient that is a parent to a newborn child in Topeka, Kansas, United States, the gifting distribution system 102 may obtain, as output from the one or more machine learning algorithms or artificial intelligence, an indication of product categories corresponding to infant toiletries (e.g., diapers, wipes, ointments, etc.), infant clothing, infant accessories (e.g., baby slings, swaddles, spit-up cloths, etc.), and the like. If the user has previously indicated, in their request, a retailer through which the surprise gift object may be made available, the gifting distribution system 102 may automatically, and in real-time, query the one or more retailer systems 110 associated with the selected retailer to identify different products within the identified product categories that may be presented to the user as possible surprise gift object selection options that may be presented to the recipient at point-of-sale locations 118 associated with the retailer. For example, if the user defines a value for the surprise gift object, the gifting distribution system 102 may query the one or more retailer systems 110 associated with the selected retailer to determine what products are available at the one or more point-of-sale locations 118 associated with the retailer and that are within the defined value of the surprise gift object. In some instances, if the retailer maintains or is otherwise associated with one or more surprise gift object storage devices 122 implemented in different point-of-sale locations 118 (including any locations not managed by or otherwise associated with the retailer), the gifting distribution system 102 may query the one or more retailer systems 110 associated with the selected retailer to determine what products may be delivered to these one or more surprise gift object storage devices 122 and that are within the defined value of the surprise gift object.

Once the gifting distribution system 102 has generated one or more surprise gift object recommendations that may be presented to the user, the gifting distribution system 102 may provide, through the gifting application 106 and/or other application 108, these one or more surprise gift object recommendations. For instance, the gifting distribution system 102 may dynamically, and in real-time, update a graphical user interface (GUI) associated with the gifting application 106 and/or other application 108 to present the one or more surprise gift object recommendations through the user device 104. Through the GUI or other interface associated with the gifting application 106 and/or other applications 108 implemented on the user device 104, the user may select one or more products from the one or more surprise gift object recommendations to finalize creation of the surprise gift object that is to be provided to the recipient. Returning to the earlier illustrative example of a recipient that is a new parent to a newborn child, the user may select, from the one or more surprise gift object recommendations, a box of newborn diapers, a container of baby formula, a set of newborn outfits, and a pack of baby swaddles. Further, the user may select the particular point-of-sale location 118 through which these products are to be provided to the recipient as possible selection options for the surprise gift object purchased by the user.

In an embodiment, any selections made by the user in response to the one or more surprise gift object recommendations can be used to dynamically re-train the one or more machine learning algorithms or artificial intelligence implemented to dynamically, and in real-time, provide surprise gift object recommendations to users based on any provided recipient information. For example, if the gifting distribution system 102 generates, based on a particular cluster identified by the one or more machine learning algorithms or artificial intelligence, one or more surprise gift object recommendations corresponding to automotive parts, but the user selects one or more baby products made available by the retailer at one or more point-of-sale locations 118 (either through available product inventory at the one or more point-of-sale locations 118 or otherwise delivered to one or more surprise gift object storage devices 122 implemented at the one or more point-of-sale locations 118) within geographic proximity of the recipient as gift selection options for the surprise gift object, the gifting distribution system 102 may use this alternative selection of baby products as negative feedback indicative of a need to adjust or otherwise modify the one or more vectors and corresponding clusters maintained by the one or more machine learning algorithms or artificial intelligence such that the recipient, and other similarly-situated recipients (e.g., new parents with newborn children, other parents with small children, etc.), are assigned similar classifications or clusters. Alternatively, if the gifting distribution system 102 generates, based on a particular cluster identified by the one or more machine learning algorithms or artificial intelligence, one or more surprise gift object recommendations corresponding to baby products, and the user selects one or more products corresponding to the provided one or more surprise gift object recommendations, the gifting distribution system 102 may use this selection of baby products as positive feedback indicative of the present accuracy of the one or more vectors and corresponding clusters. This positive feedback may thus be used to further reinforce the one or more machine learning algorithms or artificial intelligence.

In an embodiment, the user, through the gifting application 106 or other application 108, can submit a surprise gift object request corresponding to a monetary value that may be applied at a point-of-sale location 118 during a recipient transaction at the point-of-sale location 118. For example, in their surprise gift object request, the user may provide identifying information corresponding to the recipient (e.g., recipient name, recipient electronic address, recipient physical address, etc.) and any surprise gift object parameters that are to be associated with the new surprise gift object. The surprise gift object parameters for this type of surprise gift object may include an identifier corresponding to one or more retailers for which the surprise gift object may be applicable. For example, through the surprise gift object request, the user may select one or more retailers for which the indicated monetary value may be automatically applied to a recipient transaction associated with any of these one or more retailers.

In some instances, the one or more surprise gift object parameters may be used to define a particular date or range of dates during which the surprise gift object may be automatically applied to a recipient transaction associated with any of these one or more retailers. For example, the user may indicate, in their surprise gift object request, that the indicated monetary value is to be applied to recipient transactions occurring on the recipient's birthday and at any point-of-sale location 118 associated with one or more selected retailers. As another illustrative example, the user may indicate, in their surprise gift object request, that the indicated monetary value is to be applied to recipient transactions occurring within a particular range of dates and/or times at any point-of-sale location 118 associated with one or more selected retailers. In some instances, if the user provides a particular date as a surprise gift object parameter, the gifting distribution system 102 may automatically define a date range centered on the particular date for applying the surprise gift object (e.g., the monetary value) to a recipient transaction at a point-of-sale location 118. For example, if the user provides, as a surprise gift object parameter, the recipient's birthday for application of the surprise gift object, the gifting distribution system 102 may automatically define a one-week date range, whereby the recipient's birthday may correspond to the earliest date at which the surprise gift object may be applied to a recipient transaction. This may provide an opportunity to provide the surprise gift object to the recipient on a different date, should the recipient not engage in a transaction at a point-of-sale location 118 on the indicated date.

In an embodiment, once the user has defined a surprise gift object for a particular recipient, the gifting distribution system 102 may transmit, to one or more retailer systems 110, the surprise gift object parameters and other information associated with a surprise gift object that is to be presented to the recipient at a point-of-sale location 118. The one or more retailer systems 110 may be implemented by one or more retailers and other entities for management of one or more point-of-sale locations 118 associated with these one or more retailers. For example, a particular retailer may implement one or more retailer systems 110 to provide inventory management for one or more point-of-sale locations 118. For instance, the one or more retailer systems 110, in response to a query from an entity (e.g., user, recipient, gifting distribution system 102, etc.), may provide an indication of the products that may be available at different point-of-sale locations 118 associated with the corresponding retailer. As an illustrative example, if a user submits a query to a retailer system 110 for baby products and indicates their location as Zzyzx, California, United States, the retailer system 110 may automatically, and in real-time, identify any point-of-sale locations 118 within a proximity range of Zzyzx, California, United States (e.g., within 5 miles, within 10 miles, within 25 miles, etc.) and determine the present inventory of baby products within these point-of-sale locations 118. In response to the query, the retailer system 110 may provide the user with an indication (e.g., query results) of the baby products made available by the retailer at these point-of-sale locations 118.

In some instances, the one or more retailer systems 110 may be implemented by one or more retailers and other entities for management of different surprise gift object storage devices 122 implemented at different point-of-sale locations 118 and/or other locations (e.g., train stations, schools, gyms, post offices, etc.) accessible to the one or more retailers and other users. As noted above, different surprise gift object storage devices 122 may be implemented independently from the point-of-sale locations 118 and other locations where these different surprise gift object storage devices 122 are located. For example, while a surprise gift object storage device 122 may be associated with a particular retailer, the point-of-sale location 118 where the surprise gift object storage device 122 is located may be managed by a different retailer or other entity that has limited to no actual interaction with the surprise gift object storage device 122. However, the surprise gift object storage device 122 may be accessible to the particular retailer, which may stock the surprise gift object storage device 122, deliver and store inventory within the surprise gift object storage device 122, track user interactions with the surprise gift object storage device 122, and the like.

Based on the provided surprise gift object parameters and other information associated with the surprise gift object that is to be presented to the recipient at a point-of-sale location 118, the one or more retailer systems 110 may associate the surprise gift object with the intended recipient. For example, if a retailer, through the one or more retailer systems 110, maintains an account or user profile associated with the intended recipient, the one or more retailer systems 110 may automatically update this account or user profile to associate the newly received surprise gift object with the recipient. As an illustrative example, if the recipient is a member of a loyalty rewards program associated with a retailer through which the surprise gift object is to be presented to the recipient, the one or more retailer systems 110 may associate the surprise gift object with a unique identifier associated with the recipient and the loyalty rewards program. As another illustrative example, if the recipient maintains an online account with the retailer through which the surprise gift object is to be presented to the recipient, the one or more retailer systems 110 may automatically associate the surprise gift object with this online account.

In an embodiment, when a new surprise gift object is associated with an intended recipient, the one or more retailer systems 110 may use the surprise gift object parameters associated with the surprise gift object to determine when to notify the recipient of the surprise gift object. For example, if the new surprise gift object is to be provided to a recipient through a surprise gift object storage device 122 at a particular point-of-sale location 118 or other location where the surprise gift object storage device 122 is implemented, the one or more retailer systems 110 may determine that the recipient is to be notified of the surprise gift object when the one or more retailer systems 110 detect the recipient's presence within the point-of-sale location 118 or other location where the surprise gift object storage device

122 is implemented. For instance, if the recipient implements a retailer application 114 associated with the one or more retailer systems 110 on their recipient device 112, the retailer application 114 may automatically, and in real-time, transmit location data to the one or more retailer systems 110, subject to recipient authorization. The location data may include Global Positioning System (GPS) location data, Internet Protocol (IP)-based geolocation data, Wi-Fi positioning data, cellular trilateration data, and the like. The one or more retailer systems 110 may automatically process the location data to determine the approximate location of the recipient device 112. Based on this approximate location, the one or more retailer systems 110 may determine whether the recipient is within the proximity of the point-of-sale location 118 through which the surprise gift object is to be provided (e.g., through a surprise gift object storage device 122, through one or more point-of-sale systems 120, etc.). Alternatively, if the surprise gift object is to be provided through a surprise gift object storage device 122 implement at a location not associated with the particular retailer, the one or more retailer systems 110 may determine whether the recipient is within proximity of the surprise gift object storage device 122 itself.

In an embodiment, the gifting distribution system 102 can determine when to notify the recipient of a new surprise gift object on behalf of the one or more retailer systems 110. For example, instead of the retailer application 114 or other application 116 implemented on the recipient device 112 transmitting location data to the one or more retailer systems 110, the location data may be automatically, and in real-time, transmitted to the gifting distribution system 102. The gifting distribution system 102 may use the location data associated with the recipient device 112 to determine the approximate location of the recipient. Further, the gifting distribution system 102 may compare this approximate location of the recipient to known locations of point-of-sale locations 118 associated with the one or more retailer systems 110 to determine whether the recipient is within a particular point-of-sale location 118. If the recipient is within a particular point-of-sale location 118, the gifting distribution system 102 may determine, based on the one or more surprise gift object parameters, whether the surprise gift object may be provided to the recipient at the point-of-sale location 118. For instance, if the surprise gift object is to be provided through a surprise gift object storage device 122, the gifting distribution system 102 may query the one or more retailer systems 110 to determine whether the particular point-of-sale location 118 implements one or more surprise gift object storage devices for storage of a surprise gift object. Further, if the particular point-of-sale location 118 does implement one or more surprise gift object storage devices, the gifting distribution system 102 may determine whether at least one surprise gift object storage device 122 is available to make the surprise gift object available to the recipient. If so, the gifting distribution system 102, through the one or more retailer systems 110, may reserve the surprise gift object storage device 122 and transmit instructions to the one or more retailer systems 110 to store the surprise gift object in the surprise gift object storage device 122 at the particular point-of-sale location 118.

If the surprise gift object is stored within the surprise gift object storage device 122, and the gifting distribution system 102 and/or one or more retailer systems 110 determine that the recipient is within proximity of the surprise gift object storage device 122, the gifting distribution system 102 and/or one or more retailer systems 110 may automatically notify the recipient of the surprise gift object. For example, the gifting distribution system 102 and/or one or more retailer systems 110 may transmit one or more executable instructions to a retailer application 114 associated with the retailer making the surprise gift object available to the recipient through a surprise gift object storage device 122 or to another application 116 implemented on the recipient device 112 to notify the recipient, through the recipient device 112, of the surprise gift object. As an illustrative example, as the recipient enters a point-of-sale location 118 where the surprise gift object storage device 122 is implemented, the retailer application 114 or other application 116 implemented on the recipient device 112 may issue a notification indicating that the recipient has received a surprise gift object that is available at a particular surprise gift object storage device 122 at the point-of-sale location 118. The notification may include a unique identifier corresponding to the particular surprise gift object storage device 122 that is used to store the surprise gift object, any unique codes or passwords required to access the surprise gift object storage device 122, the entity that provided the surprise gift object (e.g., the user, etc.), and the like. Similarly, if the surprise gift object storage device 122 is implemented at a location other than a point-of-sale location 118, the retailer application 114 or other application 116 implemented on the recipient device 112 may issue a notification indicating that the recipient may collect a surprise gift object from the surprise gift object storage device 122 at this location. The notification may similarly include any unique codes or passwords required to access the surprise gift object storage device 122, as well as any information that may be useful to the recipient for finding the surprise gift object storage device 122 at or near to this location.

In some instances, the recipient, through the retailer application 114 or other application 116 implemented on the recipient device 112, may be provided with a timeframe during which the surprise gift object is available within the indicated surprise gift object storage device 122. For instance, the gifting distribution system 102 and/or one or more retailer systems 110 may indicate that the surprise gift object will be available within the particular surprise gift object storage device 122 for a limited period of time, after which the surprise gift object may be automatically converted to a gift card or other gift object corresponding to the monetary value associated with the original surprise gift object. In some instances, if the surprise gift object is not obtained from the surprise gift object storage device 122 within the limited period of time, the user (e.g., sender of the surprise gift object) may be automatically refunded for their purchase of the surprise gift object. The timeframe provided to the recipient for collecting the surprise gift object from the surprise gift object storage device 122 may give the recipient flexibility in retrieving a surprise gift object once notified of the availability of the surprise gift object at the surprise gift object storage device 122.

In an embodiment, if the recipient accesses the surprise gift object storage device 122 to obtain their surprise gift object, the surprise gift object storage device 122 (such as through an automated system or through a retailer associate) may transmit a notification to the one or more retailer systems 110 to indicate that the surprise gift object has been retrieved from the surprise gift object storage device 122. The one or more retailer systems 110 may, in turn, transmit a notification to the gifting distribution system 102 to indicate that the surprise gift object has been retrieved from the surprise gift object storage device 122. In some instances, if the recipient, through the surprise gift object storage device 122, is provided with a set of surprise gift object selection options (as defined by the user, the gifting distribution system 102, and/or the one or more retailer systems 110 based on the surprise gift object parameters) for the surprise gift object, the surprise gift object storage device 122 may identify the recipient's selection from these selection options and provide a notification to the one or more retailer systems 110 indicating this selection. Returning to the earlier illustrative example, where the user has selected, from the one or more surprise gift object recommendations, a box of newborn diapers, a container of baby formula, a set of newborn outfits, and a pack of baby swaddles, the surprise gift object storage device 122 may be stocked with these selected items, which may be presented to the recipient for their selection of one or more of these selected items. If the recipient obtains, from the surprise gift object storage device 122, a set of newborn outfits while leaving behind the box of newborn diapers, the container of baby formula, and the pack of baby swaddles, the surprise gift object storage device 122 may transmit a notification to the one or more retailer systems 110 to indicate the recipient's selection of the set of newborn outfits. This selection information may be provided to the gifting distribution system 102, which may further notify the user of the recipient's selection.

In an embodiment, the recipient's selection of a surprise gift object (or lack thereof) from a surprise gift object storage device 122 is used to further dynamically update, in real-time, the one or more machine learning algorithms and/or artificial intelligence trained to provide users with recommendations for surprise gift objects for different recipients. As noted above, the gifting distribution system 102 may implement a clustering algorithm that is dynamically trained to identify similar surprise gift object requests and similar recipient profiles based on one or more vectors (e.g., age, geographic location, other demographic information, other provided information, etc.). The recipient's selection of a surprise gift object from the surprise gift object storage device 122 (e.g., retrieval of a sole object from the surprise gift object storage device 122, retrieval of an object from a set of objects selected by the user from the surprise gift object storage device 122, etc.) may be used as positive feedback corresponding to the recipient's reception of the surprise gift object. This positive feedback may be used to dynamically reinforce the one or more machine learning algorithms and/or artificial intelligence such that, for similar recipient profiles and requests, the gifting distribution system 102 may be more likely to identify the appropriate cluster for providing surprise gift object recommendations to users. Alternatively, if the recipient rejects the surprise gift object from the surprise gift object storage device 122 (e.g., the recipient does not select any object from the surprise gift object storage device 122, the recipient opts to obtain a gift card in lieu of selection of an object from the surprise gift object storage device 122, etc.), the gifting distribution system 102 may use this rejection of the surprise gift object as negative feedback corresponding to the recipient's reception to the surprise gift object. This negative feedback may be used to dynamically re-train the one or more machine learning algorithms and/or artificial intelligence (e.g., re-clustering of similar recipient profiles according to one or more vector adjustments, etc.) to improve the accuracy of the one or more machine learning algorithms and/or artificial intelligence in generating surprise gift object recommendations to users.

In an embodiment, a surprise gift object storage device 122 can be used to store a set of surprise gift objects that can be available to multiple recipients, whereby the surprise gift objects available through the surprise gift object storage device 122 may be depleted and restocked as recipients retrieve surprise gift objects from the surprise gift object storage device 122. In such an embodiment, the gifting distribution system 102 can provide users (e.g., gift senders or purchasers) with a curated list of items that may be made available through the surprise gift object storage device 122 at a particular point-of-sale location 118. This curated list of items may each have the same or substantially similar value such that a user purchasing a surprise gift object for a recipient can allow the recipient to select, from the curated list of items made available through the surprise gift object storage device 122, an available item as the surprise gift object.

In an embodiment, the one or more machine learning algorithms and/or artificial intelligence trained to provide users with recommendations for surprise gift objects for different recipients is further dynamically trained to identify any opportunities to combine sets of surprise gift objects for different recipients within a surprise gift object storage device 122, whereby these sets of surprise gift objects may include one or more overlapping surprise gift objects. As an illustrative example, a first user may select, for a first recipient and based on provided surprise gift recommendations, a box of newborn diapers, a container of baby formula, a set of newborn outfits, and a pack of baby swaddles. If a second user selects, for a second recipient and based on provided surprise gift recommendations for this second recipient, a box of newborn diapers, a container of baby formula, a set of baby bottles, and a bottle warmer, the one or more machine learning algorithms and/or artificial intelligence may automatically determine, in real-time, if these surprise gift object options to be provided to the first and second recipients can be provided through a single surprise gift object storage device 122. For instance, in response to detecting an overlap between surprise gift object options for different recipients, the one or more machine learning algorithms and/or artificial intelligence may evaluate the recipient information corresponding to these different recipients and the surprise gift parameters corresponding to the requests submitted for generating surprise gifts for these recipients to determine whether the surprise gift object options to be provided to these recipients can be consolidated within a single surprise gift object storage device 122. For instance, if the one or more machine learning algorithms and/or artificial intelligence determine that the surprise gift objects for these different recipients may be provided through the same point-of-sale location 118 (e.g., based on provided recipient location information, etc.), the one or more machine learning algorithms and/or artificial intelligence may store the different surprise gift object options for these different recipients within a single surprise gift object storage device 122 implemented at the point-of-sale location 118. This may reduce the number of surprise gift object storage devices 122 that may be implemented to provide different recipients within the same or similar surprise gift object options.

In an embodiment, as the one or more machine learning algorithms and/or artificial intelligence are dynamically updated in real-time to improve the clustering of similar surprise gift object requests and similar recipient profiles based on the aforementioned one or more vectors, the gifting distribution system 102 may identify different correlations amongst different recipient profiles that may be used to identify possible efficiencies related to the implementation of the surprise gift object storage devices 122 at different locations and to inventory management by the one or more retailer systems 110. For example, as the one or more machine learning algorithms or artificial intelligence identify opportunities to combine sets of surprise gift objects for different recipients within a surprise gift object storage device 122, the gifting distribution system 102 may determine whether there are any correlations amongst these different recipients that may denote trends corresponding to different surprise gift object storage devices 122, different point-of-sale locations 118, and different retailers. As an illustrative example, if the gifting distribution system 102 determines that correlations amongst different recipient profiles denote a trend whereby surprise gift object storage devices 122 associated with a particular retailer at a particular location (e.g., point-of-sale location 118, another location supplied by a retailer point-of-sale location or distribution center, etc.) are routinely used to provide a particular set of items are surprise gift objects to recipients, the gifting distribution system 102 may provide, to the particular retailer (such as through the one or more retailer systems 110 associated with the particular retailer), data indicating that this particular set of items are routinely selected as surprise gift objects that are distributed through surprise gift object storage devices 122 implemented by the retailer at a given location. This may assist the particular retailer in maintaining proper inventory levels for these items at the given location in order to support surprise gift object requests associated with the given location according to the identified trends.

The curated list of items that may be made available through different surprise gift object storage devices 122 may correspond to different curated gift categories. For example, a gifting distribution system 102 may be associated with one or more gift curators that may identify different items (e.g., gifts) that may be offered for each curated gift category. As used herein, a gift curator (also referred to herein as an expert) is an authority on selecting gifts of a particular category. A gift curator may have a reputation for selecting well-received gift selection options. For example, a famous children's designer may curate one or more curated gift categories that include different sets of children's clothing according to different price points (e.g., a curated gift category including children's clothing valued at $25, a curated gift category including children's clothing valued at $50, etc.). The gift selection options of a curated gift category may be selected (in whole or in part) by the gift curator. In an embodiment, the gift curator may select all of the gift selection options corresponding to a curated gift category. In an embodiment, the gift curator may select an initial set of gift selection options, with the gifting distribution system 102 selecting a number of additional items that may be included as gift selection options for the curated gift category.

In some instances, each curated gift category may be associated with a monetary value such that the items included in the curated gift category may each have the same or similar monetary value. This may allow a user to select a curated gift category according to the monetary value the user would like to put towards a surprise gift object for the recipient while ensuring that the items associated with the curated gift category each correspond to the defined monetary value. This may allow a recipient, accessing a surprise gift object storage device 122 to obtain their surprise gift object, to select from items associated with the selected curated gift category having the same or similar values, subject to availability.

As noted above, if the gifting distribution system 102 and/or one or more retailer systems 110 determine that the recipient is within the point-of-sale location 118 or other location that implements the surprise gift object storage device 122, the gifting distribution system 102 and/or one or more retailer systems 110 may automatically notify the recipient of the surprise gift object. In an embodiment, if the surprise gift object available to the recipient corresponds to a curated gift category that includes various items that are made available to multiple recipients through a surprise gift object storage device 122, the gifting distribution system 102, through the one or more retailer systems 110, can provide the recipient, in real-time, with an inventory of the items currently available within the surprise gift object storage device 122. For example, if the surprise gift object storage device 122 is initially stocked with different items of children's clothing, the gifting distribution system 102, through the one or more retailer systems 110 may provide the recipient (such as through a retailer application 114 or other application 116 implemented on the recipient device 112) with an inventory of the different items of children's clothing available in the surprise gift object storage device 122. If another recipient accesses the surprise gift object storage device 122 and retrieves one or more items of children's clothing, the surprise gift object storage device 122 may automatically, and in real-time, transmit a notification to the gifting distribution system 102 and/or the one or more retailer systems 110 to indicate the remaining items of children's clothing are available through the surprise gift object storage device 122. Accordingly, the gifting distribution system 102, through the one or more retailer systems 110, may provide the recipient with an updated inventory of the items of children's clothing that are available within the surprise gift object storage device 122. This may allow the recipient to identify, in real-time, what items may be available for selection as a surprise gift object and determine whether to select an item from the surprise gift object storage device 122 or to convert the surprise gift object into a gift card or other form of gift (e.g., a different item from another gift category, etc.).

In an embodiment, if the surprise gift object corresponds to a monetary value that may be applied to a recipient transaction at any point-of-sale location 118 associated with one or more particular retailers (as specified by the user in their surprise gift object request), the gifting distribution system 102 can automatically, and in real-time, detect when a recipient interacts with one or more point-of-sale systems 120 to engage in a transaction during which the surprise gift object may be applied. As an illustrative example, when the recipient engages a point-of-sale system 120 at a point-of-sale location 118, the point-of-sale system 120 may automatically prompt the recipient for identifying information associated with the recipient. As noted above, this identifying information may include a recipient name, recipient electronic address, recipient physical address, loyalty rewards information, payment information, or any other identifying information that may be used to uniquely identify the recipient. If the recipient, through the point-of-sale system 120, provides their identifying information, the point-of-sale system 120 may automatically transmit the provided identifying information to the one or more retailer systems 110.

In response to obtaining identifying information corresponding to the recipient, the one or more retailer systems 110 may evaluate the identifying information to determine whether the identifying information is associated with an existing recipient account or profile. For example, if the recipient provides a loyalty rewards number corresponding to a loyalty rewards program provided by a retailer, the one or more retailer systems 110 may use the provided loyalty rewards number to identify an account corresponding to this loyalty rewards number. The account may include additional identifying information associated with the recipient (e.g., a recipient name, recipient electronic address, recipient physical address, etc.) that may be further used to uniquely identify the recipient.

The one or more retailer systems 110 may provide the identifying information obtained from the one or more point-of-sale systems 120 and from any existing recipient accounts or profiles to the gifting distribution system 102 to determine whether a surprise gift object is available for the recipient through the one or more point-of-sale systems 120. In response to obtaining the identifying information associated with the recipient, the gifting distribution system 102 may query a recipient information datastore to determine whether the provided identifying information corresponds to a particular surprise gift object that is available to the recipient through the one or more point-of-sale systems 120. If the provided identifying information does correspond to an existing surprise gift object that may be provided to the recipient, the gifting distribution system 102 may provide the surprise gift object to the one or more retailer systems 110. For example, if the surprise gift object is a $50 gift applicable towards a recipient transaction, the gifting distribution system 102 can provide the one or more retailer systems 110 with an indication that $50 is to be automatically applied to the recipient transaction through the point-of-sale system 120.

The one or more retailer systems 110 may transmit a notification to the point-of-sale system 120 to apply the surprise gift object to the pending transaction. Returning to the previous illustrative example, whereby the user has purchased a $50 credit towards a recipient transaction at the point-of-sale location 118, the point-of-sale system 120 may automatically, and in real-time, provide the recipient with an indication of the availability of the $50 credit towards their transaction. This indication may include identifying information of the user that purchased the $50 credit for the recipient as a surprise gift object. For example, the point-of-sale system 120 may display a notification such as "Kelly just gave you a $50 credit towards your purchase!," whereby the notification may indicate the identity of the user that purchased the surprise gift object (e.g., "Kelly") and the monetary value of the surprise gift object (e.g., "$50"). Through the point-of-sale system 120, the recipient may determine whether to apply the surprise gift object to their present transaction or to redeem the surprise gift object in the form of a gift card, a credit towards a future transaction, an equivalent amount of cryptocurrency, an equivalent amount of loyalty rewards points or other credits, and the like.

Figure 2:
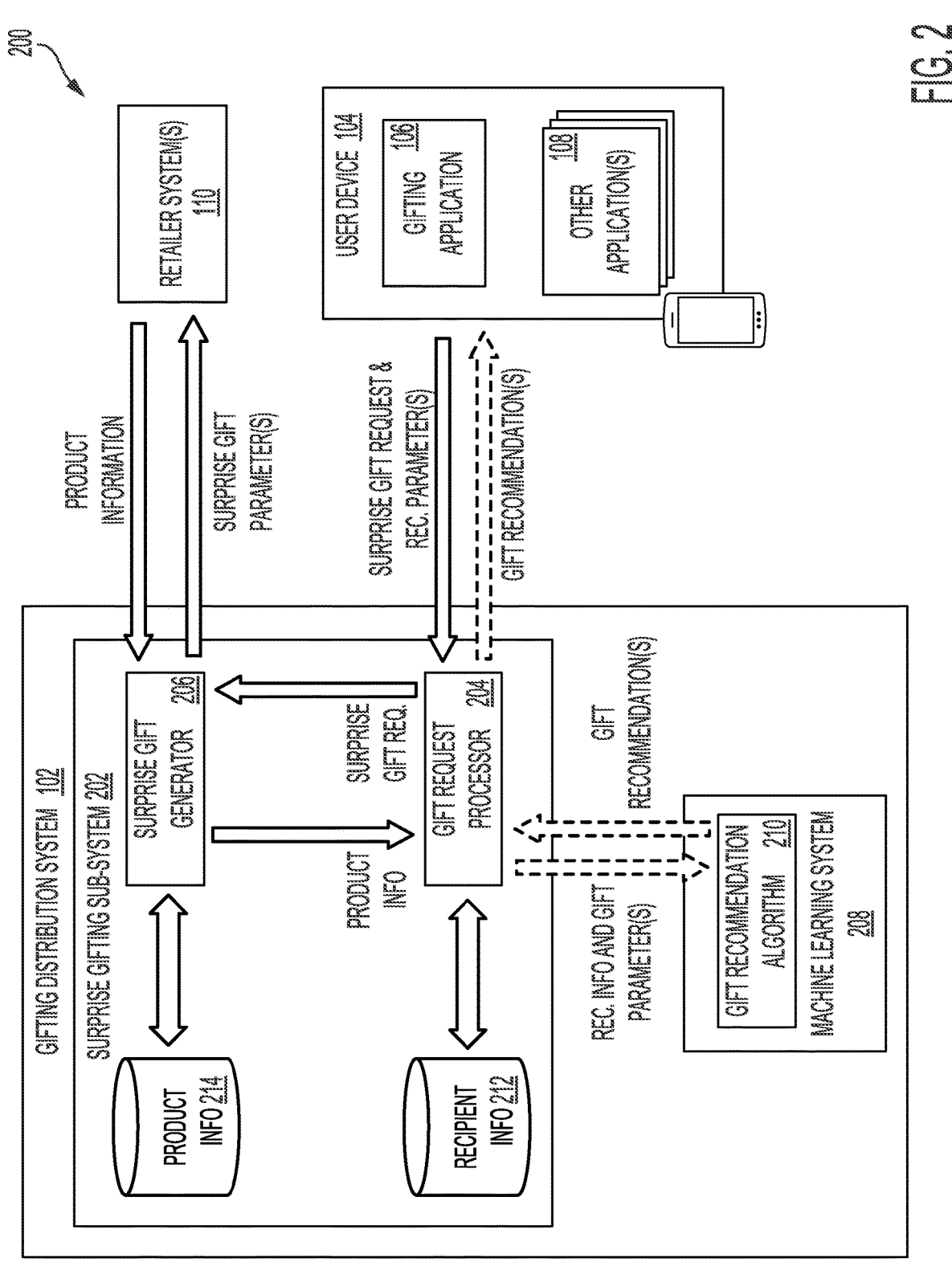
FIG. 2 shows an illustrative example of an environment in which a gifting distribution system generates a surprise gift object for an intended recipient in response to a user request and provides the surprised gift object to one or more retailer systems for disbursement to the intended recipient upon detection of the intended recipient at a location in accordance with at least one embodiment.

FIG. 2 shows an illustrative example of an environment 200 in which a gifting distribution system 102 generates a surprise gift object for an intended recipient in response to a user request and provides the surprised gift object to one or more retailer systems 110 for disbursement to the intended recipient upon detection of the intended recipient at a point-of-sale location or other location through which a surprise gift object may be made available to the intended recipient in accordance with at least one embodiment. In the environment 200, a user, through their user device 104, may transmit a request to a gift request processor 204 associated with the gifting distribution system 102 to generate a new surprise gift object for a particular recipient. The gift request processor 204 may be implemented through a surprise gifting sub-system 202 associated with the gifting distribution system 102. In an embodiment, the surprise gifting sub-system 202 is implemented as an application or other executable process on a computing system or other system (e.g., server, special-purpose computing device, etc.) of the gifting distribution system 102.

The request from the user device 104 to the gift request processor 204 may be submitted by the user through a dedicated gifting application 106 implemented on the user device 104. The gifting application 106 may be made available by the gifting distribution system 102 for use in generating different gift objects, such as surprise gift objects, for intended recipients. As noted above, through the gifting application 106, a user may define one or more parameters whereby an indication of a surprise gift object is to be automatically presented to the recipient when the recipient enters or otherwise accesses a particular point-of-sale location or other location through which the surprise gift object may be provided. This point-of-sale location or other location may be associated with a particular retailer or other entity. As another illustrative example, through the gifting application 106, the user may define one or more parameters whereby an indication of the surprise gift objects is to be automatically presented to the recipient when the recipient engages one or more point-of-sale systems associated with the point-of-sale location.

In an embodiment, the gift request processor 204, through the gifting application 106, may provide the user with various options for defining a new surprise gift object for a particular recipient. For example, through the gifting application 106, the gift request processor 204 may provide the user with various options for providing identifying information associated with the intended recipient for the surprise gift object. These various options may allow the user, for example, to define the recipient's name, the recipient's physical address or geographic location, the recipient's electronic mail address, the recipient's demographic information, and the like. In some instances, the gift request processor 204, through the gifting application 106, may prompt the user to provide additional information regarding the intended recipient that may be used to provide recommendations corresponding to different gift categories or items that may be of interest to the recipient and that the user may select as possible gift selection options presentable to the intended recipient. For example, the gift request processor 204 may prompt the user to indicate any hobbies that the intended recipient is interested in. As another example, the gift request processor 204 may prompt the user to indicate if the surprise gift object is being provided in commemoration of a life event associated with the intended recipient (e.g., birth of a child, a birthday, an anniversary, etc.). Based on the obtained identifying information, the gift request processor 204 may automatically construct a recipient profile associated with the intended recipient.

It should be noted that while interactions with the gift request processor 204 are described extensively through the perspective of the gifting application 106, the user may access the gift request processor 204 through other applications 108 implemented on the user device 104. For example, if the gifting distribution system 102 is associated with one or more retailers through corresponding one or more retailer systems 110, the gifting distribution system 102 may expose an application programming interface (API) through which applications associated with these one or more retailers may access the gift request processor 204. For instance, if the user executes an application associated with a particular retailer, and the particular retailer maintains a relationship with the gifting distribution system 102, the application may access the gift request processor 204 through the exposed API to allow the user to submit requests to the gift request processor 204 for generating surprise gift objects. As another illustrative example, the user may be able to access the gift request processor 204 through a browser application implemented on the user device 104. Through the browser application, the user may be able to access a web portal or web site associated with the gifting distribution system 102 and through which the gift request processor 204 may be made available to the user.

In an embodiment, when the user provides identifying information associated with an intended recipient, the gift request processor 204 uses the provided identifying information to query a recipient information datastore 212 to determine whether the gifting distribution system 102 maintains an existing recipient profile associated with the intended recipient. For example, if the user and/or other users have previously generated surprise gift objects or other gift objects that were disbursed to the recipient, the surprise gifting sub-system 202 may maintain, within the recipient information datastore 212, a recipient profile corresponding to this recipient. The recipient profile may include additional identifying information associated with the recipient. For example, if the user provides, in their request for a new surprise gift object that is to be disbursed to the recipient, the name and physical address of the recipient, the gift request processor 204 may automatically query the recipient information datastore 212 using this provided information to identify an existing profile associated with the recipient. Through this existing profile, the gift request processor 204 may supplement the provided recipient information with the recipient's known electronic mail address, the recipient's demographic information, and the like. In an embodiment, through an existing recipient profile, the gift request processor 204 can further obtain historical data corresponding to gift objects previously disbursed to the recipient. As an illustrative example, through an existing recipient profile, the gift request processor 204 may determine that the recipient has previously received a gift of diapers for their newborn child, a gift of children's clothing for their newborn child, and a gift of a changing table. Additionally, through the existing recipient profile, the gift request processor 204 may determine what gift selection options were previously presented to the recipient and, based on these presented gift selection options, the gift selections made by the recipient (including any selections of alternative gifts, such as a gift card or other items not presented as original gift selection options). As described in greater detail herein, this identification of previously provided gift selection options and selections may be used to inform what recommendations may be provided to the user and/or the recipient for gift selection options that may be presented to the recipient for the surprise gift object.

In an embodiment, in response to the surprise gift object request, the gift request processor 204 submits the received surprise gift object request to a surprise gift generator 206 implemented by the surprise gifting sub-system 202. The surprise gift generator 206 may automatically, and in real-time, interact with one or more retailer systems 110 associated with one or more retailers to obtain product information associated with the products made available by these one or more retailers through their point-of-sale locations and/or through surprise gift object storage devices implemented at these point-of-sale locations or other locations. The product information may include stock keeping units (SKUs) corresponding to the different products available through these point-of-sale locations and/or through surprise gift object storage devices implemented at these point-of-sale locations or other locations. Further, for each of these SKUs, the one or more retailer systems 110 may provide an indication of the available inventory for the associated product. This product information may be provided independent of any pending surprise gift object requests from users associated with the gifting distribution system 102. For instance, the one or more retailer systems 110 may automatically, and in real-time, provide product information to the surprise gift generator 206. Alternatively, the surprise gift generator 206 may automatically, and in real-time, query the one or more retailer systems 110 to obtain the real-time product information associated with the associated point-of-sale locations and/or the surprise gift object storage devices associated with the particular retailer and through which surprise gift objects may be made available. This product information may be cached in memory or otherwise stored in a product information datastore 214, which may allow the surprise gift generator 206, in response to a surprise gift object request, to query the product information datastore 214 to obtain the real-time product information corresponding to the products that may be available within the point-of-sale locations specified in the surprise gift object request or otherwise associated with a known geographic location of the recipient (e.g., the recipient's physical address, the recipient's most commonly visited point-of-sale locations, etc.).

In some instances, the product information provided by the one or more retailer systems 110 may further indicate any products that are reserved for other surprise gift object requests. For instance, while a particular retailer may have a certain amount of inventory available for a particular product at a point-of-sale location, a portion of this amount may have already been allocated or reserved for other surprise gift object disbursements. Accordingly, the surprise gift generator 206 may automatically, and in real-time, use the obtained product information and information corresponding to pending surprise gift object requests to determine the actual inventory available at different point-of-sale locations and/or through surprise gift object storage devices associated with the particular retailer. In some instances, when a surprise gift object request is fulfilled (e.g., a recipient retrieves a surprise gift object from a point-of-sale location or through a surprise gift object storage device, etc.), the one or more retailer systems 110 may automatically update their inventory information and release any inventory previously reserved for the surprise gift object request and that were not selected by the recipient. For example, if a particular product was stored in different surprise gift object storage devices associated with different retailer point-of-sale locations (such as to allow for flexibility with regard to locations through which a surprise gift object may be made available to a recipient), if a recipient obtains said product from a particular surprise gift object storage device, the one or more retailer systems 110 may automatically update their inventory information to release any product inventory associated with this product previously reserved for the other surprise gift object storage devices that were not accessed by the recipient for the surprise gift object. Thus, the product information obtained by the surprise gift generator 206 may be reflective of the product inventory available to users at the given time and may take into account, in real-time, any inventory that is currently reserved for other surprise gift object requests.

In an embodiment, the surprise gift generator 206 provides the product information associated with the identified point-of-sale locations and/or other locations through which surprise gift objects may be made available to recipients (e.g., surprise gift object storage device locations, etc.) to the gift request processor 204, which the gift request processor 204 can use to generate one or more surprise gift object recommendations for the user and/or to otherwise provide the user with an inventory of the items available at the identified point-of-sale locations and/or other locations through which surprise gift objects may be made available to recipients and that may be used to define the surprise gift object. To generate the one or more surprise gift object recommendations, the gift request processor 204, in an embodiment, transmits the obtained recipient information (e.g., as provided by the user and/or obtained from the recipient information datastore 212), the surprise gift object parameters as defined by the user (e.g., value of the surprise gift object, point-of-sale locations and/or surprise gift object storage device locations through which the surprise gift object is to be made available, purpose for the surprise gift object, date(s) during which the surprise gift object is to be made available to the recipient, etc.), and the product information associated with the identified one or more point-of-sale locations to a machine learning system 208 associated with the gifting distribution system 102.

The machine learning system 208, in an embodiment, implements a gift recommendation algorithm 210 that is dynamically, and in real-time, trained to provide one or more surprise gift object recommendations to users, which may allow these users to further refine the gift selection options that may be presented to a recipient for their surprise gift object. The gift recommendation algorithm 210 may include a clustering algorithm that is dynamically trained to identify similar surprise gift object requests and similar recipient profiles based on one or more vectors (e.g., age, geographic location, other demographic information, other provided information, etc.). The machine learning system 208 may perform such clustering of surprise gift object requests and associated recipient profiles and obtain partial matches among other recipient profiles and/or other surprise gift object requests according to these one or more vectors. In some instances, a dataset of recipient profiles and/or other surprise gift object requests corresponding to other surprise gift object requests may be analyzed using the gift recommendation algorithm 210 to identify different types of recipient profiles and/or other surprise gift object requests associated with the gifting distribution system 102. The gift recommendation algorithm 210, in an embodiment, is dynamically trained in real-time using sample recipient profiles (e.g., recipient profiles corresponding to historical recipients of surprise gift objects, hypothetical recipient profiles corresponding to hypothetical surprise gift object requests, etc.), and/or sample surprise gift object requests (e.g., actual historical surprise gift object requests, hypothetical surprise gift object requests, etc.) datasets to analyze the surprise gift object request and/or the profiles of the indicated recipient so as to determine various aspects of the surprise gift object request. The gift recommendation algorithm 210 may be implemented using k-means clustering algorithms, FCM algorithms, EM algorithms, hierarchical clustering algorithms, DBSCAN algorithms, and the like. Based on the output of these algorithms, the machine learning system 208 may generate a set of surprise gift object recommendations that may be provided to the user for further defining the surprise gift object that is to be made available to the recipient.

In an embodiment, the gift recommendation algorithm 210 is further dynamically, and in real-time, trained to identify any opportunities for consolidating different sets of surprise gift objects for different recipients within a point-of-sale location or through a surprise gift object storage device. For instance, the machine learning system 208 may generate a sample dataset that includes sample surprise gift object requests (e.g., actual historical surprise gift object requests, hypothetical surprise gift object requests, etc.) and sample recipient surprise gift object selections (e.g., actual recipient selections, hypothetical recipient selections, etc.) that may be processed by the gift recommendation algorithm 210 to identify any correlations between these requests and selections that may be used to identify possible opportunities for consolidating different sets of surprise gift objects corresponding to different surprise gift object requests within a single surprise gift object storage device for the recipients associated with these requests. These identified correlations may be evaluated by the machine learning system 208 to determine whether these correlations are accurate or otherwise comport with expected correlations identified by the machine learning system 208 or other entity tasked with identifying these correlations (e.g., an administrator of the gifting distribution system 102, etc.). Based on this evaluation, the gift recommendation algorithm 210 may be dynamically re-trained to improve the accuracy of the correlations identified by the gift recommendation algorithm 210.

In response to a received surprise gift object request, the gift recommendation algorithm 210 may automatically identify any other pending surprise gift object requests for which surprise gift object selection options are to be provided to other recipients within the specified point-of-sale location or other location through which a surprise gift object storage device is implemented and during the same time frame as that indicated in the received surprise gift object request. Returning to an earlier illustrative example, a first user may select, for a first recipient and based on provided surprise gift recommendations, a box of newborn diapers, a container of baby formula, a set of newborn outfits, and a pack of baby swaddles. If a second user selects, for a second recipient and based on provided surprise gift recommendations for this second recipient, a box of newborn diapers, a container of baby formula, a set of baby bottles, and a bottle warmer, the gift recommendation algorithm 210 may automatically determine, in real-time, if these surprise gift object selection options to be provided to the first and second recipients can be provided through a single surprise gift object storage device at the location indicated by both the first user and the second user. If the gift recommendation algorithm 210 determines that such a consolidation may be performed, the gift recommendation algorithm 210 may provide the gift request processor 204 with an indication of this consolidation opportunity such that the different surprise gift object requests may be fulfilled through storage of the sets of surprise gift object selection options within the indicated surprise gift object storage device.

In an embodiment, the machine learning system 208 further updates the gift recommendation algorithm 210 in real-time as users select different gift selection options for surprise gift objects that are to be presented to intended recipients and as recipients make their gift selections from the provided gift selection options or make alternative gift selections (e.g., selection of a gift card or other monetary value, selection of a gift object not associated with the presented gift selection options, etc.). For example, the machine learning system 208 may automatically monitor user interaction with any provided surprise gift object recommendations to determine whether the user has adhered to the provided recommendations (e.g., has selected a set of gift selection options recommended by the machine learning system 208, has opted to select an alternative set of gift selection options not recommended by the machine learning system 208, etc.). Based on the adherence (or lack of adherence) to the provided surprise gift object recommendations, the machine learning system 208 may dynamically, and in real-time, update the gift recommendation algorithm 210. For example, the machine learning system 208 may dynamically, and in real-time, update the dataset used to train the gift recommendation algorithm 210 and perform a re-clustering of the dataset, which may result in defining new sets of clusters for the gift recommendation algorithm 210. In some instances, the machine learning system 208 may dynamically, and in real-time update the set of vectors and/or the vector features according to an evaluation of the user feedback (e.g., user adherence to provided recommendations, lack of adherence to provided recommendations, etc.) to update the gift recommendation algorithm 210.

As noted above, the machine learning system 208 can dynamically, and in real-time, update the gift recommendation algorithm 210 as recipients receive their surprise gift objects. For instance, if the recipient makes a selection of a particular gift object from a set of gift selection options generated by the user, the machine learning system 208 may determine whether the set of gift selection options were generated from the set of surprise gift object recommendations previously provided to the user. If so, this may serve as positive feedback with regard to the recommendations previously provided to the user, which may allow the machine learning system 208 to dynamically, and in real-time, re-train the gift recommendation algorithm 210 as described above for adherence to provided recommendations. However, if the recipient selects an alternative gift selection option (e.g., the recipient opts to obtain a gift card in lieu of selection of an object from the provided gift selection options, the recipient opts to obtain a different object from those presented as gift selection options, etc.), the machine learning system 208 may evaluate the recipient's selection of the alternative gift selection option to determine whether the selection corresponds to a previously provided surprise gift object recommendation that was not adhered to by the user. If the recipient's selection corresponds to a previously provided surprise gift object recommendation that was not adhered to by the user, the machine learning system 208 may determine that the provided surprise gift object recommendation was accurate and update the gift recommendation algorithm 210 accordingly. However, if the recipient's selection does not correspond to a previously provided surprise gift object recommendation, the machine learning system 208 may dynamically, and in real-time, update the dataset used to generate the clusters for the gift recommendation algorithm 210 to cause the gift recommendation algorithm 210 to perform a re-clustering of the dataset.

In an embodiment, once the user has finalized their surprise gift object request (e.g., has selected one or more gift selection options to be presented to the recipient, has selected the one or more point-of-sale locations through which the surprise gift object may be provided, has selected a date or date range during which the surprise gift object is to be available, etc.), the gift request processor 204 may provide the finalized surprise gift object request to the surprise gift generator 206 for fulfillment. In response to the surprise gift object request, the surprise gift generator 206 may transmit the surprise gift object parameters to the one or more retailer systems 110 for fulfillment of the request. For instance, if the one or more gift selection options selected by the user are to be stocked within a surprise gift object storage device at a particular point-of-sale location, or other location through which the surprise gift object storage device is implemented, during a pre-defined time period (e.g., a particular set of days, a particular week, etc.), the surprise gift generator 206 may automatically coordinate with the one or more retailer systems 110 such that, during the pre-defined time period, a surprise gift object storage device at the designated point-of-sale location or other designated location is stocked with the items corresponding to the different surprise gift object selection options defined by the user. Further, the surprise gift object parameters may allow the one or more retailer systems 110 to automatically notify a recipient regarding an available surprise gift object. Returning to the previous illustrative example, whereby the one or more gift selection options selected by the user are to be stocked within a surprise gift object storage device during a pre-defined time period, the one or more retailer systems 110 may automatically determine when the recipient is at the location where the surprise gift object storage device is implemented (such as through real-time evaluation of location data associated with the recipient) and whether their presence corresponds to the pre-defined time period during which the surprise gift object is made available. If so, the one or more retailer systems 110 may automatically notify the recipient, while the recipient is at the designated location, of the availability of the surprise gift object.

Figure 3:
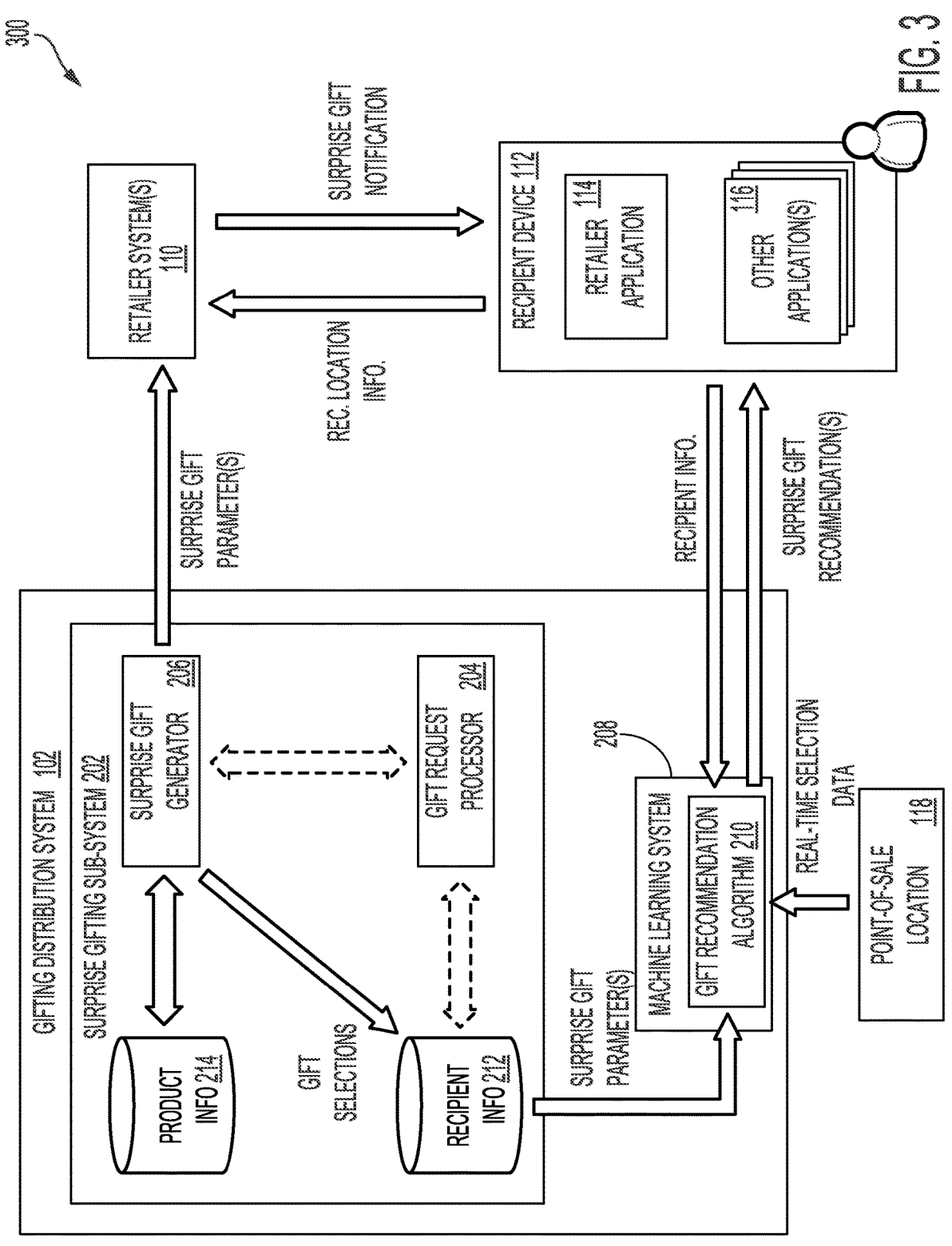
FIG. 3 shows an illustrative example of an environment in which a gifting distribution system automatically and in real-time provides a recipient of a surprise gift object with one or more gift recommendations for redemption of the surprise gift object at a location in accordance with at least one embodiment.

FIG. 3 shows an illustrative example of an environment 300 in which a gifting distribution system 102 automatically and in real-time provides a recipient of a surprise gift object with one or more gift recommendations for redemption of the surprise gift object at a point-of-sale location or other location through which a surprise gift object may be retrieved (e.g., surprise gift object storage device, etc.) in accordance with at least one embodiment. As illustrated in FIG. 3, the environment 300 may include various elements similar to that of the gifting distribution system 102 illustrated in FIG. 2. For example, as illustrated in FIG. 3, the gifting distribution system 102 may implement the surprise gifting sub-system 202, which may include the aforementioned gift request processor 204, the surprise gift generator 206, and machine learning system 208. Additionally, the machine learning system 208 may implement a gift recommendation algorithm 210 which, as described in greater detail herein, is further dynamically trained to provide recipients with recommendations for different products or product categories from which the recipient may select as a surprise gift object from a particular user (e.g., sender of the surprise gift object).

As noted above, when a user finalizes a surprise gift object request for disbursement of a surprise gift object to a particular recipient, the surprise gift generator 206 may transmit, to one or more retailer systems 110, a set of surprise gift object parameters associated with the surprise gift object request. The surprise gift object parameters may specify the point-of-sale location 118 or other location at which the surprise gift object is to be made available to the recipient. Additionally, the surprise gift object parameters may define a date or date range corresponding to when the surprise gift object is to be made available at the indicated point-of-sale location 118 or other location. This date or date range may be used to inform the one or more retailer systems 110 as to when the recipient may be notified of the availability of the surprise gift object at the point-of-sale location 118 or other location through which the surprise gift object is made available (e.g., a location that implements one or more surprise gift object storage devices, etc.). In some instances, the surprise gift object parameters may further define a set of products that may serve as surprise gift object selection options presentable to the recipient at the point-of-sale location 118 or other location for selection of the surprise gift object.

In an embodiment, in lieu of providing a set of products that may serve as surprise gift object selection options, a user may select a particular product category from which a set of products may be recommended to the recipient when notified of the availability of a surprise gift object at a point-of-sale location 118 or other location through surprise gift objects are made available. As noted above, a user may select a curated gift category corresponding to a particular gift value, whereby the items included in the curated gift category may each have the same or similar monetary value. This may allow a user to select a curated gift category according to the monetary value the user would like to put towards a surprise gift object for the recipient while ensuring that the items associated with the curated gift category each correspond to the defined monetary value. In some instances, the user may simply define a surprise gift object value and allow the gifting distribution system 102 to automatically, and in real-time, provide the recipient with surprise gift object recommendations once the surprise gift object is available to the recipient, as described in greater detail herein. Alternatively, in some instances, the user may select a particular product category without regard to the monetary value of the different products included within the particular product category. If the user selects a particular product category without defining a set monetary value for the surprise gift object, the gifting distribution system 102 may provide the user with an invoice corresponding to the monetary value of the surprise gift object selected by the recipient from the particular product category when the recipient selection is made. This may allow the user to provide the recipient with a greater set of surprise gift object selection options corresponding to a particular product category and to defer payment for the surprise gift object until the recipient has made their selection.

In response to obtaining the set of surprise gift object parameters associated with a particular surprise gift object, the one or more retailer systems 110 may automatically, and in real-time, obtain and evaluate location data associated with a recipient device 112 to determine whether the recipient is at a point-of-sale location 118 or other location through which the surprise gift object is to be made available. For instance, if the recipient implements a retailer application 114 associated with the one or more retailer systems 110 on their recipient device 112, the retailer application 114 may automatically, and in real-time, transmit location data to the one or more retailer systems 110, subject to recipient authorization. The location data may include GPS location data, IP-based geolocation data, Wi-Fi positioning data, cellular trilateration data, and the like. As noted above, the one or more retailer systems 110 may automatically process the location data to determine the approximate location of the recipient device 112. Based on this approximate location, the one or more retailer systems 110 may determine whether the recipient is within the proximity of the point-of-sale location 118 or other location through which the surprise gift object is to be provided.

In some embodiments, the recipient device 112, through the retailer application 114 or other application 116 implemented on the recipient device 112 (e.g., an application provided by the gifting distribution system 102, a browser application, etc.) can provide location data to the gifting distribution system 102. In response to receiving the location data, the gifting distribution system 102 may query the recipient information datastore 212 to determine whether there is a pending surprise gift object for the recipient and, if so, whether the surprise gift object corresponds to the present location of the recipient device 112. For example, in some instances, a recipient may be associated with multiple surprise gift objects that may be associated with different point-of-sale locations 118 associated with different retailers, as well as with other locations through which surprise gift objects may be made available (e.g., locations that implement one or more surprise gift object storage devices, etc.). Accordingly, the gifting distribution system 102, through the surprise gifting sub-system 202, may query the recipient information datastore 212 using the provided location data and known recipient identifying information to determine whether the recipient has an available surprise gift object at a point-of-sale location 118 or other location where the recipient may be currently at. If so, the surprise gifting sub-system 202 may transmit a notification to the one or more retailer systems 110 associated with the particular point-of-sale location 118 or other location through which the one or more retailer systems 110 may manage one or more surprise gift object storage devices to indicate that the surprise gift object is to be made available to the recipient. Further, the surprise gifting sub-system 202 or the one or more retailer systems 110 may notify the recipient of the availability of the surprise gift object at the point-of-sale location 118 or other location where the surprise gift object may be stored within a surprise gift object storage device.

If the gifting distribution system 102 and/or the one or more retailer systems 110 determine that the recipient is in proximity to a point-of-sale location 118 or other location through which a surprise gift object may be provided to the recipient, and the surprise gift object is available to the recipient (e.g., the current date corresponds to the date or date range defined by the user for disbursement of the surprise gift object, etc.), the gifting distribution system 102 and/or the one or more retailer systems 110 may notify the recipient of the availability of the surprise gift object. For example, the gifting distribution system 102 and/or one or more retailer systems 110 may transmit one or more executable instructions to a retailer application 114 associated with the point-of-sale location 118/other location wherein the surprise gift object may be made available (e.g., a particular retailer, etc.) or to another application 116 implemented on the recipient device 112 to notify the recipient, through the recipient device 112, of the surprise gift object. As an illustrative example, as the recipient enters the point-of-sale location 118, the retailer application 114 or other application 116 implemented on the recipient device 112 may issue a notification indicating that the recipient has received a surprise gift object that is available at the point-of-sale location 118. As another illustrative example, if the surprise gift object is stored within a surprise gift object storage device implemented at the recipient's location (e.g., a post office, a train station, etc.), the retailer application 114 or other application 116 may issue a notification indicating that the recipient has received a surprise gift object that is available at the particular surprise gift object storage device at their location. If the surprise gift object is stored within a surprise gift object storage device at the point-of-sale location 118 or other indicated location, the notification may include a unique identifier corresponding to the particular surprise gift object storage device that is used to store the surprise gift object, any unique codes or passwords required to access the surprise gift object storage device, the entity that provided the surprise gift object (e.g., the user, etc.), and the like.

In an embodiment, if the surprise gift object is not associated with a particular set of surprise gift object selection options, the machine learning system 208, through the gift recommendation algorithm 210, can provide the recipient with one or more surprise gift object recommendations corresponding to items that may be available at the point-of-sale location 118 and/or through different surprise gift object storage devices (whether implemented at the point-of-sale location 118 or other location) that may be appealing to the recipient and having a value approximately equal to the surprise gift object value defined by the sender of the surprise gift object. The machine learning system 208 may use, as input to the gift recommendation algorithm 210, identifying information associated with the recipient (as obtained from the recipient device 112 and/or from an existing recipient profile) and the applicable surprise gift object parameters (e.g., value of the surprise gift object, any known occasion for provisioning of the surprise gift object, any selected surprise gift object categories for the surprise gift object, date(s) during which the surprise gift object is being made available, etc.). The gift recommendation algorithm 210 may automatically evaluate the provided input along the one or more aforementioned vectors to obtain partial matches among other recipient profiles and/or other surprise gift objects to determine what products may be recommended to the recipient for selection as the surprise gift object.

In an embodiment, when the recipient, at the point-of-sale location 118 or other location through which the surprise gift object is made available to the recipient, obtains their surprise gift object, the one or more systems implemented at the point-of-sale location 118 or other location through which the surprise gift object is made available to the recipient may transmit, in real-time, data corresponding to the surprise gift object obtained by the recipient to the machine learning system 208. As noted above, if the machine learning system 208 provides the recipient with a set of surprise gift object recommendations, the one or more systems associated with the point-of-sale location 118, or other location through which surprise gift objects are made available, may transmit data corresponding to the recipient's selection of a particular surprise gift object selection option (e.g., a selection option provided through a recommendation, an alternative selection option independently selected by the recipient, conversion to a gift card, conversion to a cryptocurrency, etc.) to the machine learning system 208. As another illustrative example, if the recipient is provided with a set of pre-defined surprise gift object selection options through a surprise gift object storage device (e.g., options selected by a sender of the surprise gift object, options curated by a gift curator or other expert, etc.), the systems associated with the point-of-sale location 118, or other location that implements the surprise gift object storage device, may determine whether the recipient has selected one or more products from the options provided to the recipient or has opted to obtain an alternative gift object (e.g., a gift card, a product not included in the set of options, a conversion of the gift value to a cryptocurrency, a conversion of the gift value to a loyalty rewards amount, etc.).

The machine learning system 208 may, in real-time and as the selection is made by the recipient, evaluate the recipient's selection according to the original surprise gift object parameters and the recipient profile associated with the recipient to update the gift recommendation algorithm 210. For instance, if the recipient selects a particular gift from the set of surprise gift object selection options provided by the user (e.g., sender of the surprise gift object), the machine learning system 208 may determine that the set of surprise gift object selection options provided by the user were appropriate for the recipient. As noted above, if this set of surprise gift object selection options were provided based on a set of recommendations previously provided by the machine learning system 208 to the user, this may serve as positive feedback with regard to the recommendations previously provided to the user. This may allow the machine learning system 208 to dynamically, and in real-time, re-train the gift recommendation algorithm 210 for adherence to provided recommendations. However, if the recipient selects an alternative gift selection option, the machine learning system 208 may evaluate the recipient's selection of the alternative gift selection option to determine whether the selection corresponds to a previously provided surprise gift object recommendation that was not adhered to by the user. If the recipient's selection corresponds to a previously provided surprise gift object recommendation that was not adhered to by the user, the machine learning system 208 may determine that the provided surprise gift object recommendation was accurate and may update the gift recommendation algorithm 210 accordingly. However, if the recipient's selection does not correspond to a previously provided surprise gift object recommendation (whether the recommendation was provided to the user or to the recipient), the machine learning system 208 may dynamically, and in real-time, update the dataset used to generate the clusters for the gift recommendation algorithm 210 to cause the gift recommendation algorithm 210 to perform a re-clustering of the dataset.

It should be noted that the machine learning system 208 may dynamically, and in real-time, update the gift recommendation algorithm 210 as surprise gift objects are obtained by different recipients from different point-of-sale locations 118 and other locations through which surprise gift objects are made available to these different recipients (e.g., surprise gift object storage devices implemented at locations other than point-of-sale locations 118, etc.). For instance, the machine learning system 208 may obtain, from myriad point-of-sale locations 118/other locations through which surprise gift objects are made available and for myriad recipients, different surprise gift object selections associated to surprise gift objects made available to these recipients. The machine learning system 208 may dynamically, and in real-time, evaluate each of these different selections as they are received in order to determine the accuracy of the gift recommendation algorithm 210 and dynamically, and in real-time, update the gift recommendation algorithm 210 accordingly.

Figure 4A:
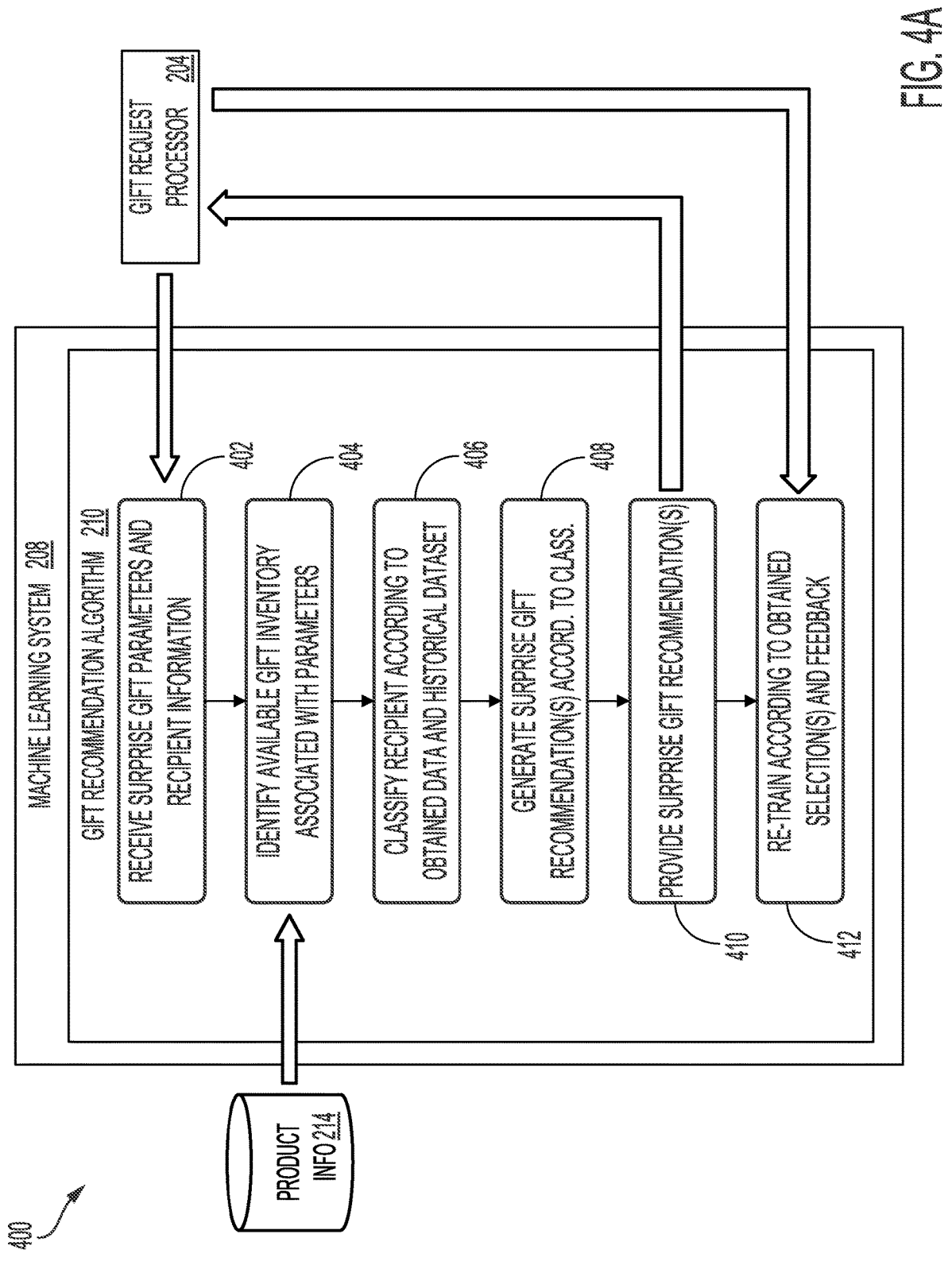
FIGS. 4A-4B show an illustrative example of an environment in which a gift recommendation algorithm is dynamically trained to provide surprise gift object recommendations in response to requests to generate a surprise gift object and to detection of a recipient at a location associated with a surprise gift object in accordance with at least one embodiment.
Figure 4B:
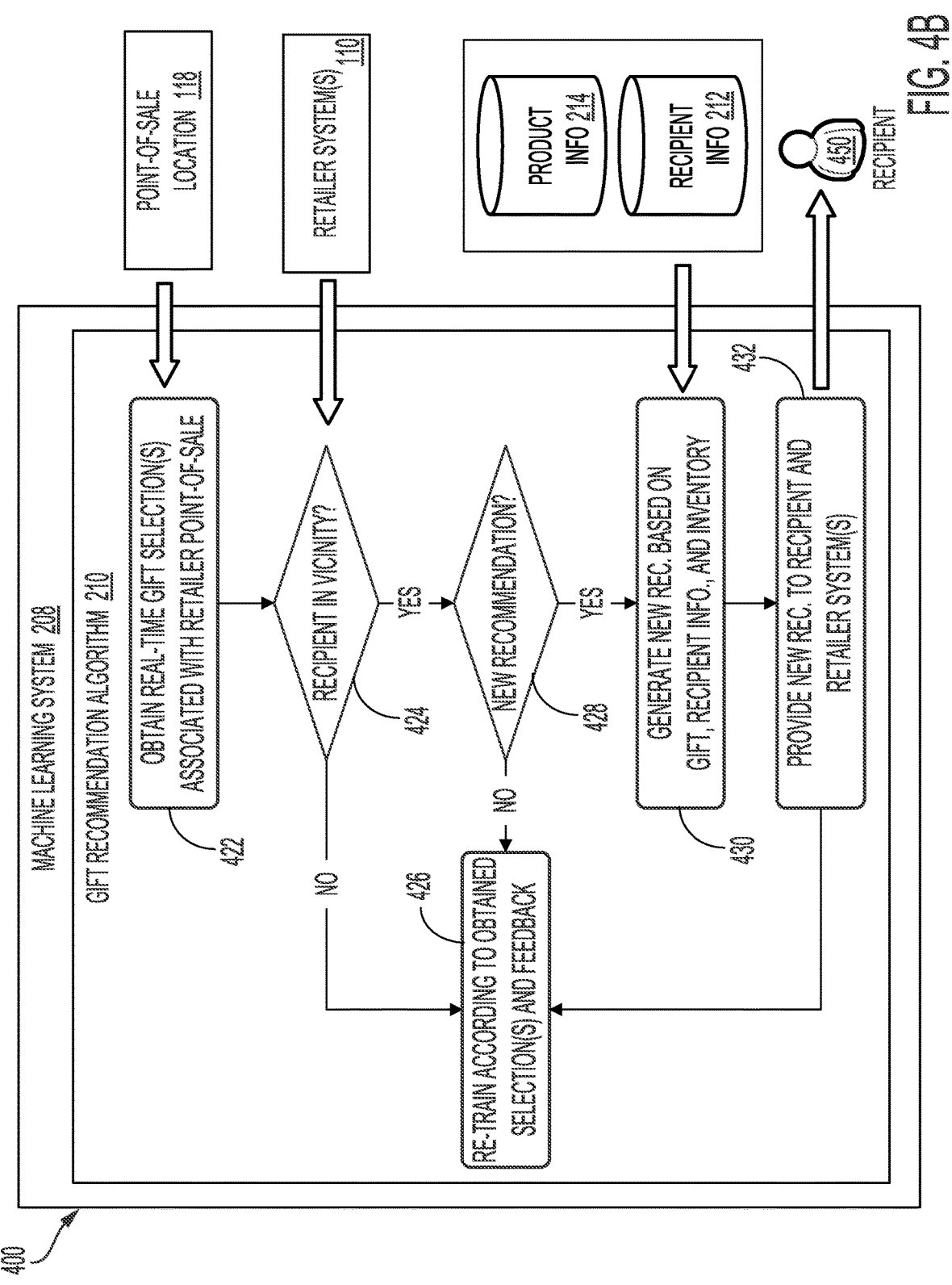

FIGS. 4A-4B show an illustrative example of an environment 400 in which a gift recommendation algorithm 210 is dynamically trained to provide surprise gift object recommendations in response to requests to generate a surprise gift object and to detection of a recipient at a point-of-sale location or other location through which a surprise gift object may be made available in accordance with at least one embodiment. As noted above, a user may transmit a request to a gift request processor 204 to generate and provide a surprise gift object to a particular recipient. The surprise gift object may be provided to the recipient upon detection of the recipient at a point-of-sale location or other location where the surprise gift object is made available to the recipient. Further, the surprise gift object may be made available during a pre-defined period of time, as defined in the user's request to generate and provide the surprise gift object, as described above. In their request to the gift request processor 204, the user may provide identifying information associated with the intended recipient (e.g., the recipient's name, the recipient's physical address or geographic location, the recipient's electronic mail address, the recipient's demographic information, etc.). Further, the user may define a set of applicable surprise gift object parameters that may further be used to define the surprise gift object (e.g., value of the surprise gift object, any known occasion for provisioning of the surprise gift object, any selected surprise gift object categories for the surprise gift object, date(s) during which the surprise gift object is being made available, etc.).

In the environment 400, and as illustrated in FIG. 4A, the gift request processor 204 may provide the obtained identifying information associated with the intended recipient, as well as the provided surprise gift object parameters for the surprise gift object, to the gift recommendation algorithm 210 implemented by the machine learning system 208. Thus, at step 402, the gift recommendation algorithm 210 may receive the identifying information associated with the intended recipient and the surprise gift object parameters for the new surprise gift object.

At step 404, the gift recommendation algorithm 210 may identify the available gift inventory associated with the provided surprise gift object parameters. As noted above, the surprise gifting sub-system may implement a product information datastore 214, through which the surprise gifting sub-system may cache or otherwise store product information associated with the products made available by one or more retailers through their point-of-sale locations or that otherwise may be stored within different surprise gift object storage devices maintained by the one or more retailers at other locations. This product information may include SKUs corresponding to the different products available through these point-of-sale locations or that otherwise may be stored within different surprise gift object storage devices maintained by the one or more retailers at other locations. Further, for each of these SKUs, the product information datastore 214 may include an indication of the available inventory for the associated product. The product information stored in the product information datastore 214 may be obtained from the one or more retailer systems in real-time and independent of any pending surprise gift object requests. In some instances, the product information stored in the product information datastore 214 may take into account any products that are currently held for other pending surprise gift object requests such that surprise gift object selection options corresponding to these other requests are not superseded by subsequent surprise gift object requests and corresponding recipient selections. In an embodiment, the gift recommendation algorithm 210 can query the product information datastore 214 to obtain any product information associated with different products that may correspond to the provided surprise gift object parameters. For example, if the surprise gift object is defined as having a value of $50 and is to be selected from a particular product category (e.g., newborn or infant needs, children's clothing, automotive accessories, etc.), the gift recommendation algorithm 210 may automatically query the product information datastore 214 to identify any products that have a value (or approximate value) of $50, correspond to the particular product category, and are available at any point-of-sale locations in proximity of the recipient (based on the provided identifying information associated with the recipient).

At step 406, the gift recipient algorithm 210 may automatically classify the recipient according to the obtained data (e.g., the surprise gift object parameters, the identifying information associated with the recipient, the available gift inventory, etc.) and the historical dataset corresponding to previously provided surprise gift objects and recipients. As noted above, the gift recipient algorithm 210 may be implemented as a clustering algorithm that is dynamically trained to identify similar surprise gift object requests and similar recipient profiles based on one or more vectors (e.g., age, geographic location, other demographic information, other provided information, etc.). The machine learning system 208 may perform such clustering of surprise gift object requests and associated recipient profiles and obtain partial matches among other recipient profiles and/or other surprise gift object requests according to these one or more vectors. In some instances, a dataset of recipient profiles and/or other surprise gift object requests corresponding to other surprise gift object requests may be analyzed using the gift recommendation algorithm 210 to identify different types of recipient profiles and/or other surprise gift object requests associated with the gifting distribution system. The gift recommendation algorithm 210 may evaluate the obtained data according to the one or more vectors to identify a particular cluster that may be closely associated with the recipient and the surprise gift object request submitted by the user. Accordingly, based on this cluster, the gift recommendation algorithm 210 may classify the recipient.

Through the classification of the recipient according to the one or more vectors of similarity, the gift recommendation algorithm 210, at step 408, may generate one or more surprise gift object recommendations for the user. The surprise gift object recommendations may include different products that may be selected and used to generate surprise gift objects for the recipient. Further, since the available product inventory is used as input to the gift recommendation algorithm 210, the resulting set of surprise gift object recommendations may correspond to products that are available at the one or more point-of-sale locations or other locations (e.g., locations other than point-of sale locations and where one or more surprise gift object storage devices are implemented, etc.) associated with the surprise gift object request. The surprise gift object recommendations may further include different products that may be appealing to the recipient, as determined through evaluation of the identifying information associated with the recipient according to historical data corresponding to other similarly-situated recipients (as determined through identification of a proximate cluster, etc.).

In an embodiment, the gift recommendation algorithm 210 can generate surprise gift recommendations corresponding to different surprise gift object categories that may be appealing to the recipient and that can be used to provide the recipient with a choice from a set of different surprise gift object storage devices at a particular location. Each of the different surprise gift object storage devices may include different products associated with a particular surprise gift object category. For example, a first surprise gift object storage device at the identified location may be used to store different products corresponding to infant care needs. A second surprise gift object storage device at the identified location may be used to store different products corresponding to sports memorabilia. Further, a third surprise gift object storage device at the identified location may be used to store different products corresponding to video games for a particular gaming platform. A generated surprise gift recommendation may include an option for presenting the recipient with these three different surprise gift object storage devices without identifying the product categories associated with these three different gift object storage devices. For example, when the recipient is detected as being in proximity of the identified location, the recipient may be notified of the availability of a surprise gift object and is presented with an option to select one of the three different surprise gift object storage devices (e.g., "Which device do you want to reveal? Device 1, Device 2, or Device 3?"). Based on the recipient's selection, the recipient may be provided with instructions for accessing the selected surprise gift object storage device for retrieval of their surprise gift object from the different products stored within the device and corresponding to the surprise gift object category associated with the selected device.

In some instances, the generated surprise gift recommendation may include an option for presenting the recipient with these different surprise gift object storage devices with information indicating the surprise gift object category associated with each of these devices. For example, when the recipient is detected as being in proximity of the identified location, the recipient may be notified of the availability of the surprise gift object and is presented with an option to select a surprise gift object storage device from the set of surprise gift object storage devices selected for the recipient. However, unlike the previous example where the recipient is not provided with any information regarding the contents of each of these surprise gift object storage devices, the recipient may be provided with information indicating the surprise gift object category associated with each of these surprise gift object storage devices. This may provide the recipient with the ability to determine from which surprise gift object category they would like to select a surprise gift object from. The different products that may be made available through each of these surprise gift object storage devices may be selected based on the surprise gift object parameters defined by the user (e.g., sender of the surprise gift object) and/or through evaluation of an existing recipient profile.

At step 410, the gift recommendation algorithm 210 may provide the newly generated surprise gift object recommendations to the gift request processor 204 which, in turn, may provide these recommendations to the user that submitted the surprise gift object request. The user may evaluate the provided set of surprise gift object recommendations to determine whether to adhere to these recommendations or, alternatively, disregard the provided recommendations in favor of selecting different surprise gift object selection options corresponding to other products that may be available at the point-of-sale locations or other locations corresponding to the request and presentable to the recipient at these point-of-sale locations or other locations. Based on the adherence (or lack of adherence) to the provided surprise gift object recommendations, the machine learning system 208 may dynamically, and in real-time, re-train the gift recommendation algorithm 210 at step 412. For example, the machine learning system 208 may dynamically, and in real-time, update the dataset used to train the gift recommendation algorithm 210 and perform a re-clustering of the dataset, which may result in the definition of new sets of clusters for the gift recommendation algorithm 210. In some instances, the machine learning system 208 may dynamically, and in real-time update the set of vectors and/or the vector features according to an evaluation of the user feedback (e.g., user adherence to provided recommendations, lack of adherence to provided recommendations, etc.) to update the gift recommendation algorithm 210.

As illustrated in FIG. 4B, the gift recommendation algorithm 210 may be further dynamically trained to provide recommendations to recipients for different products that may be selected for their surprise gift object at a point-of-sale location 118 or other location through which the surprise gift object may be made available to these recipients.

At step 422, the gift recommendation algorithm 210 may obtain real-time surprise gift object selections associated with one or more point-of-sale locations 118 and/or other locations through which the surprise gift object selections were made (e.g., surprise gift object storage devices implemented at locations other than point-of-sale locations 118, etc.) for any number of retailers associated with the gifting distribution system. These real-time surprise gift object selections, in an embodiment, are obtained by the gift recommendation algorithm 210 as these selections are made at these point-of-sale locations 118 and/or other locations through which the surprise gift object selections were made. For example, when a particular recipient selects one or more products from a surprise gift object storage device (as described above), the surprise gift object storage device may automatically transmit information corresponding to the selection to the gift recommendation algorithm 210, such as through one or more retailer systems 110 or through the gifting distribution system directly. In some instances, the real-time surprise gift object selections may include alternative selections made by recipients outside of the surprise gift object selection options presented to these recipients. For example, if a recipient foregoes selection of any of the provided surprise gift object selection options and instead opts to convert the surprise gift object into a gift card, a monetary value, or other form of gift (e.g., a different item from another gift category, etc.), the surprise gift object storage device may provide an indication of this conversion.

The real-time surprise gift object selections obtained by the gift recommendation algorithm 210 may include additional information that may be used to associate a received selection to a particular surprise gift object request and corresponding recipient. For example, for a particular real-time surprise gift object selection, the surprise gift object storage device may indicate identifying information associated with the recipient. This identifying information may include a name of the recipient, any unique codes or passwords used by the recipient to access the surprise gift object storage device at the point-of-sale location 118 or other location for retrieval of the surprise gift object, any other credentials used by the recipient to access the surprise gift object (e.g., payment instruments, identification instruments, etc.), location data associated with the recipient used to detect the recipient's presence at the point-of-sale location 118 or other location where the surprise gift object was made available to the recipient 450, and the like. The gift recommendation algorithm 210 may use this additional information to identify the corresponding surprise gift object request used to generate and provide the surprise gift object to the particular recipient 450. Further, as described in greater detail herein, the corresponding surprise gift object request, the real-time surprise gift object selection, and the recipient identifying information may be used to determine whether the gift recommendation algorithm 210 is providing accurate recommendations to users and/or recipients with regard to the surprise gift object selection options presented to these recipients based on the surprise gift object parameters defined in the request.

At step 424, the gift recommendation algorithm 210 may determine whether a recipient 450 designated to receive a surprise gift object is in the vicinity of a particular point-of-sale location 118 or other location at which the surprise gift object is available. As noted above, the one or more retailer systems 110 may automatically, and in real-time, obtain and evaluate location data associated with a recipient to determine whether the recipient is at a point-of-sale location 118 or other location through which a surprise gift object for the recipient is to be made available. For instance, if the recipient implements a retailer application associated with the one or more retailer systems 110 on their recipient device, the retailer application may automatically, and in real-time, transmit location data to the one or more retailer systems 110, subject to recipient authorization. Based on this location data, the one or more retailer systems 110 may determine whether the recipient is in the vicinity of a point-of-sale location 118 or other location through which a surprise gift object is to be made available to the recipient.

As noted above, in some instances, a surprise gift object may be made available to a recipient during a specified period of time. For example, if the surprise gift object is being provided for the recipient's birthday, the user submitting the surprise gift object request may indicate that the surprise gift object is to be made available to the recipient only during the recipient's birthday. Alternatively, the user may indicate that the surprise gift object may be made available for a limited period of time, starting on the recipient's birthday. In some instances, the gifting distribution system, based on a specified date for making the surprise gift object available to a recipient 450, may automatically define a date range during which the surprise gift object may be available to the recipient 450. This may provide the recipient 450 with flexibility to retrieve the surprise gift object should the recipient 450 not be in the vicinity of the corresponding point-of-sale location 118 or other location where the surprise gift object is made available on the requested date. Thus, in some instances, even if the recipient 450 is in the vicinity of a point-of-sale location 118 or other location at which the surprise gift object is to be made available, if the recipient's visit to the point-of-sale location 118 or other location falls outside of the date range during which the surprise gift object is to be made available to the recipient 450, the surprise gift object may not be available to the recipient 450 at that time.

If the gift recommendation algorithm 210 determines that the recipient 450 is not within the vicinity of the point-of-sale location 118 or other indicated location for retrieval of their surprise gift object or the recipient's presence does not correspond to the date range during which the surprise gift object is to be made available to the recipient 450, the gift recommendation algorithm 210, at step 426, may be retrained according to the obtained real-time surprise gift object selections and corresponding feedback, as provided by the myriad point-of-sale locations 118 and/or other locations corresponding to other surprise gift objects provided to other recipients. As noted above, the machine learning system 208 may dynamically, and in real-time, evaluate each of these different selections as they are received in order to determine the accuracy of the gift recommendation algorithm 210 and dynamically, and in real-time, update the gift recommendation algorithm 210 accordingly.

In an embodiment, if the gift recommendation algorithm 210 determines that the recipient 450 has opted to not retrieve the surprise gift object from the point-of-sale location 118 or other indicated location where the surprise gift object may be made available to the recipient 450, the gift recommendation algorithm 210 transmits a notification to the one or more retailer systems 110 to release any product inventory holds corresponding to the surprise gift object such that any products made available to the recipient 450 for selection as their surprise gift object may be released and made available for other surprise gift object requests. As noted above, while a particular retailer may have a certain amount of inventory available for a particular product at a point-of-sale location, a portion of this amount may be reserved for other surprise gift object disbursements. This information may be used by the surprise gift generator to determine the actual inventory available at different point-of-sale locations and/or through surprise gift object storage devices associated with the particular retailer. Thus, if the recipient 450 has opted to not retrieve the surprise gift object reserved for them, the one or more retailer systems 110 may release any previously reserved products associated with this surprise gift object. This may result in the surprise gift generator to obtain an updated, and real-time, product inventory resulting from the release of these reserved products.

In an embodiment, if the gift recommendation algorithm 210 determines that the recipient 450 is within the vicinity of a point-of-sale location 118 or other location at which a surprise gift object is available to the recipient 450 (e.g., the recipient's visit coincides with the specified date range for availability of the surprise gift object, etc.), the gift recommendation algorithm 210 may determine, at step 428, whether a new recommendation is to be provided to the recipient 450 for different surprise gift object selection options from which the surprise gift object may be selected by the recipient 450. For instance, if the surprise gift object is not associated with a particular set of surprise gift object selection options, the gift recommendation algorithm 210 can generate, at step 430, a new recommendation corresponding to items that may be available at the point-of-sale location 118 or other location (such as through a surprise gift object storage device implemented at the other location) that may be appealing to the recipient 450 and having a value approximately equal to the surprise gift object value defined by the sender of the surprise gift object. The machine learning system 208 may use, as input to the gift recommendation algorithm 210, identifying information associated with the recipient 450 (as obtained from the recipient device and/or from an existing recipient profile stored within the recipient information datastore 212) and the applicable surprise gift object parameters (e.g., value of the surprise gift object, any known occasion for provisioning of the surprise gift object, any selected surprise gift object categories for the surprise gift object, date(s) during which the surprise gift object is being made available, etc.). The gift recommendation algorithm 210 may automatically evaluate the provided input along the one or more aforementioned vectors to obtain partial matches among other recipient profiles and/or other surprise gift objects to determine what products (as deemed available through the product information datastore 214 and/or through the one or more retailer systems 110) may be recommended to the recipient for selection as the surprise gift object. At step 432, the gift recommendation algorithm 210 may provide the recipient 450 with the one or more surprise gift object recommendations corresponding to the products that may be available at the point-of-sale location 118 or through a surprise gift object storage device implemented at a different location, that may be appealing to the recipient 450, and have a value approximately equal to the surprise gift object value defined by the sender of the surprise gift object.

When the recipient 450 obtains their surprise gift object at the point-of-sale location 118 or other location through which the surprise gift object was made available, the gift recommendation algorithm 210 may be re-trained, at step 426, according to the recipient's selection of a surprise gift selection option for the surprise gift object. As noted above, the machine learning system 208 may, in real-time and as the selection is made by the recipient 450, evaluate the recipient's selection according to the original surprise gift object parameters and the recipient profile associated with the recipient 450 to re-train the gift recommendation algorithm 210. For instance, if the recipient selects a particular gift from the set of surprise gift object selection options provided by a sender of the surprise gift object, the machine learning system 208 may determine that the set of surprise gift object selection options provided by the sender were appropriate for the recipient 450. If this set of surprise gift object selection options were provided based on a set of recommendations previously provided by the machine learning system 208 to the sender, this may serve as positive feedback with regard to the recommendations previously provided to the sender. This may allow the machine learning system 208 to dynamically, and in real-time, re-train the gift recommendation algorithm 210 for adherence to provided recommendations. However, if the recipient 450 selects an alternative gift selection option, the machine learning system 208 may evaluate the recipient's selection of the alternative gift selection option to determine whether the selection corresponds to a previously provided surprise gift object recommendation that was not adhered to by the sender. If the recipient's selection corresponds to a previously provided surprise gift object recommendation that was not adhered to by the sender, the machine learning system 208 may determine that the provided surprise gift object recommendation was accurate and may update the gift recommendation algorithm 210 accordingly. However, if the recipient's selection does not correspond to a previously provided surprise gift object recommendation (whether the recommendation was provided to the sender or to the recipient 450), the machine learning system 208 may dynamically, and in real-time, update the dataset used to generate the clusters for the gift recommendation algorithm 210 to cause the gift recommendation algorithm 210 to perform a re-clustering of the dataset.

Figure 5:
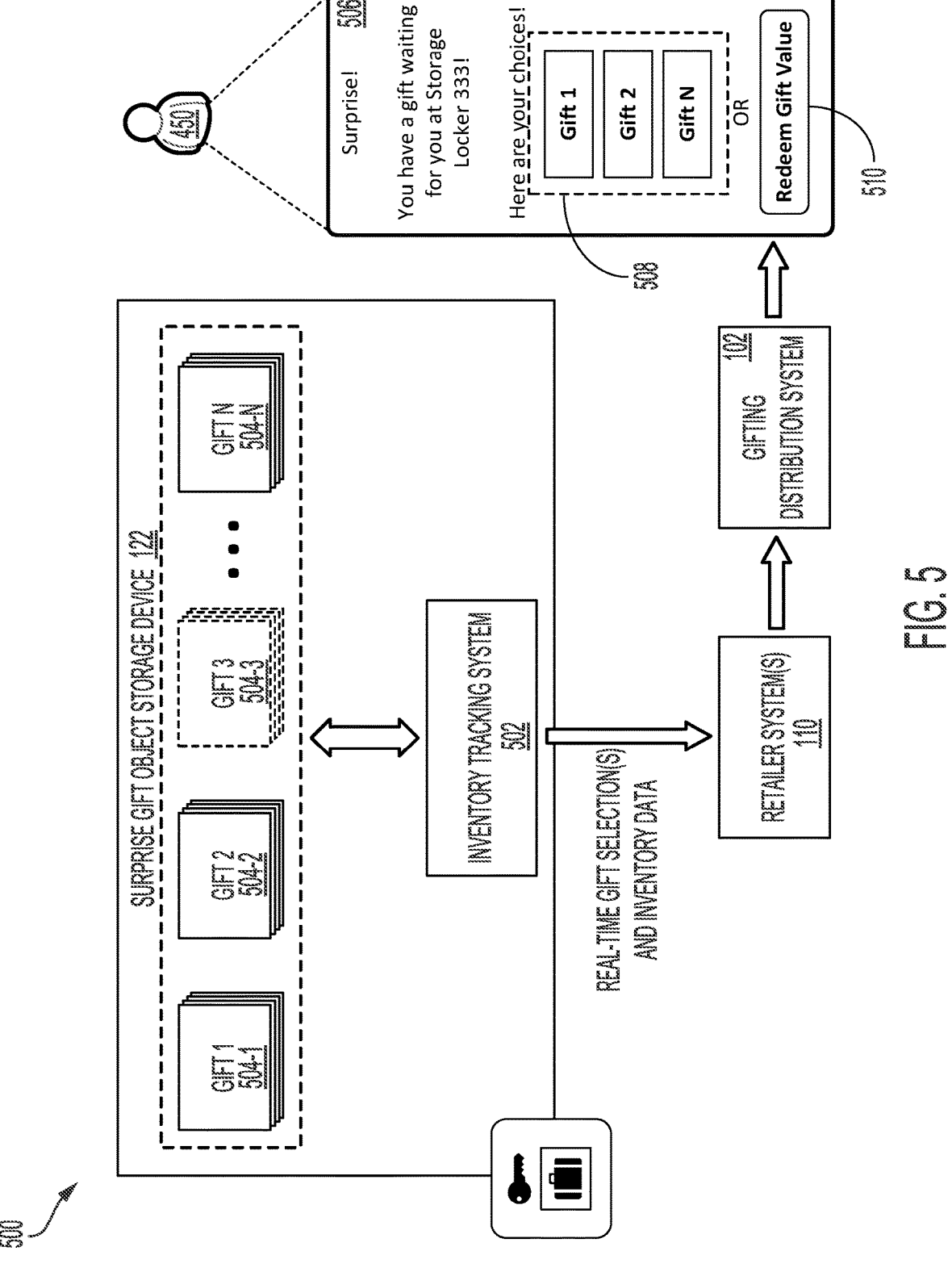
FIG. 5 shows an illustrative example of an environment in which a gifting distribution system automatically and in real-time updates a set of gift options associated with a surprise gift object in response to dynamic changes to product inventories in accordance with at least one embodiment.

FIG. 5 shows an illustrative example of an environment 500 in which a gifting distribution system 102 automatically and in real-time updates a set of gift options 504-1-504-N associated with a surprise gift object in response to dynamic changes to product inventories in accordance with at least one embodiment. In the environment 500, a retailer, at a point-of-sale location or other location accessible to the retailer, may maintain one or more surprise gift object storage devices 122, through which recipients of surprise gift objects may be provided with different surprise gift object selection options 504-1-504-N from which one or more products may be selected as their surprise gift objects. For instance, as noted above, a surprise gift object storage device 122 can be used to store a set of surprise gift object selection options 504-1-504-N that can be available to multiple recipients, whereby the surprise gift object selection options 504-1-504-N available through the surprise gift object storage device 122 may be depleted and restocked as recipients retrieve surprise gift objects from the surprise gift object storage device 122.

In an embodiment, the surprise gift object storage device 122 can include an inventory tracking system 502, which is implemented to dynamically, and in real-time, track the available inventory corresponding to the different surprise gift object selection options 504-1-504-N made available through the surprise gift object storage device 122. For instance, when a particular recipient accesses the surprise gift object storage device 122 and selects a particular product or item from the surprise gift object storage device 122, the inventory tracking system 502 may, in real-time, update the inventory information associated with the surprise gift object storage device 122 to indicate the remaining inventory associated with the products or items included in the surprise gift object storage device 122. Further, when the surprise gift object storage device 122 is restocked, new products or items are added to the surprise gift object storage device 122, existing products or items are replaced with alternative products or items, and the like, the inventory tracking system 502, in real-time, updates the inventory information associated with the surprise gift object storage device 122 to indicate the current inventory of products or items included within the surprise gift object storage device 122.

In an embodiment, the inventory tracking system 502 provides the real-time inventory information associated with the surprise gift object storage device 122 to the one or more retailer systems 110 through a real-time data feed or stream. For instance, as recipients select different surprise gift object selection options 504-1-504-N from the surprise gift object storage device 122, the inventory tracking system 502 may automatically, and in real-time, provide updated inventory information corresponding to the surprise gift object selection options 504-1-504-N made available through the surprise gift object storage device 122. Similarly, as the surprise gift object selection options 504-1-504-N are replenished or replaced with other surprise gift object selection options, the inventory tracking system 502 may automatically, and in real-time, provide updated inventory information corresponding to the surprise gift object selection options 504-1-504-N (including any new or alternative surprise gift object selection options) available through the surprise gift object storage device 122.

In an embodiment, the one or more retailer systems 110 can provide, in real-time, the updated inventory information corresponding to the surprise gift object selection options 504-1-504-N available through the surprise gift object storage device 122 to the gifting distribution system 102. As noted above, if the gifting distribution system 102 and/or one or more retailer systems 110 determine that the recipient 450 is within the point-of-sale location or other location that implements the surprise gift object storage device 122, the gifting distribution system 102 and/or one or more retailer systems 110 may automatically notify the recipient 450 of the surprise gift object. For example, as illustrated in FIG. 5, the gifting distribution system 102 and/or one or more retailer systems 110 may update an interface 506 (e.g., a graphical user interface (GUI)) associated with a retailer application implemented on the recipient's computing device to indicate that the recipient 450 has a surprise gift object available to them through the surprise gift object storage device 122. Through the interface 506, the gifting distribution system 102 and/or one or more retailer systems 110 may indicate through which surprise gift object storage device 122 at the point-of-sale location or other location the surprise gift object may be obtained. Further, if the surprise gift object storage device 122 includes any authorization mechanisms for accessing the surprise gift object storage device 122 (e.g., locks, etc.), the gifting distribution system 102 and/or one or more retailer systems 110 may provide, through the interface 506, any authentication information that may be used to access the surprise gift object storage device 122 (e.g., unique codes, one-time passwords, unique machine-readable labels, etc.).

In an embodiment, in addition to indicating the availability of a surprise gift object and the location of the surprise gift object at the point-of-sale location or other location where the surprise gift object storage device 122 is implemented, the gifting distribution system 102 and/or one or more retailer systems 110 may indicate, in real-time, the surprise gift object selection options 504-1-504-N made available through the surprise gift object storage device 122. For example, as illustrated in FIG. 5, the gifting distribution system 102 and/or one or more retailer systems 110 may provide, through the interface 506, a graphical representation 508 of the available surprise gift object selection options. This may allow the recipient 450 to determine what surprise gift object selection options are available to the recipient 450 through the surprise gift object storage device 122 at any given time during which the surprise gift object is available to the recipient 450.

As noted above, the inventory tracking system 502 associated with the surprise gift object storage device 122 may automatically, and in real-time, provide updated inventory information corresponding to the surprise gift object selection options 504-1-504-N made available through the surprise gift object storage device 122 as recipients select different surprise gift object selection options 504-1-504-N from the surprise gift object storage device 122. In an embodiment, the updated inventory information may be used by the gifting distribution system 102 and/or one or more retailer systems 110 to dynamically, and in real-time, update the graphical representation 508 of the available surprise gift object selection options to provide the recipient 450 with the real-time inventory and/or availability of the different surprise gift object selection options 504-1-504-N made available through the surprise gift object storage device 122. As an illustrative example, if the inventory tracking system 502 determines that surprise gift object selection option 504-3 is no longer available (e.g., the product or item associated with the surprise gift object selection option 504-3 is no longer in stock within the surprise gift object storage device 122, etc.), the inventory tracking system 502 may transmit a notification to the gifting distribution system 102 and/or one or more retailer systems 110 to cause the gifting distribution system 102 and/or one or more retailer systems 110 to dynamically, and in real-time, update the graphical representation 508 of the available surprise gift object selection options to remove a graphical representation of the surprise gift object selection option 504-3. For example, as illustrated in FIG. 5, as a result of the surprise gift object selection option 504-3 no longer being available, the graphical representation 508 of the available surprise gift object selection options may include graphical representations of surprise gift object selection options 504-1, 504-2, and 504-N (e.g., "Gift 1," "Gift 2," and "Gift N") while omitting any reference to surprise gift object selection option 504-3. Should the surprise gift object storage device 122 be restocked such that the surprise gift object selection option 504-3 becomes available, the gifting distribution system 102 and/or one or more retailer systems 110 may dynamically, and in real-time, update the graphical representation 508 of the available surprise gift object selection options to add a graphical representation of the surprise gift object selection option 504-3. Thus, in real-time, a recipient 450 may be able to readily determine what products or items are available to them through the surprise gift object storage device 122 for their surprise gift object.

In an embodiment, the gifting distribution system 102 and/or one or more retailer systems 110 further provides, through the interface 506, an option 510 to convert the surprise gift object into another form. If the recipient 450 selects the option 510, the gifting distribution system 102 and/or one or more retailer systems 110 may update the interface 506 to provide the recipient 450 with one or more options for conversion of the surprise gift object. This may include providing the recipient 450 with options to convert the surprise gift object into a gift card, a monetary value, or other form of gift (e.g., a different item from another gift category, cryptocurrency, loyalty rewards points, etc.). This may provide the recipient 450 with flexibility to select an alternative option should the recipient 450 deem the different surprise gift object selection options 504-1-504-N currently available through the surprise gift object storage device 122 to not be appealing or desirable.

Figure 6:
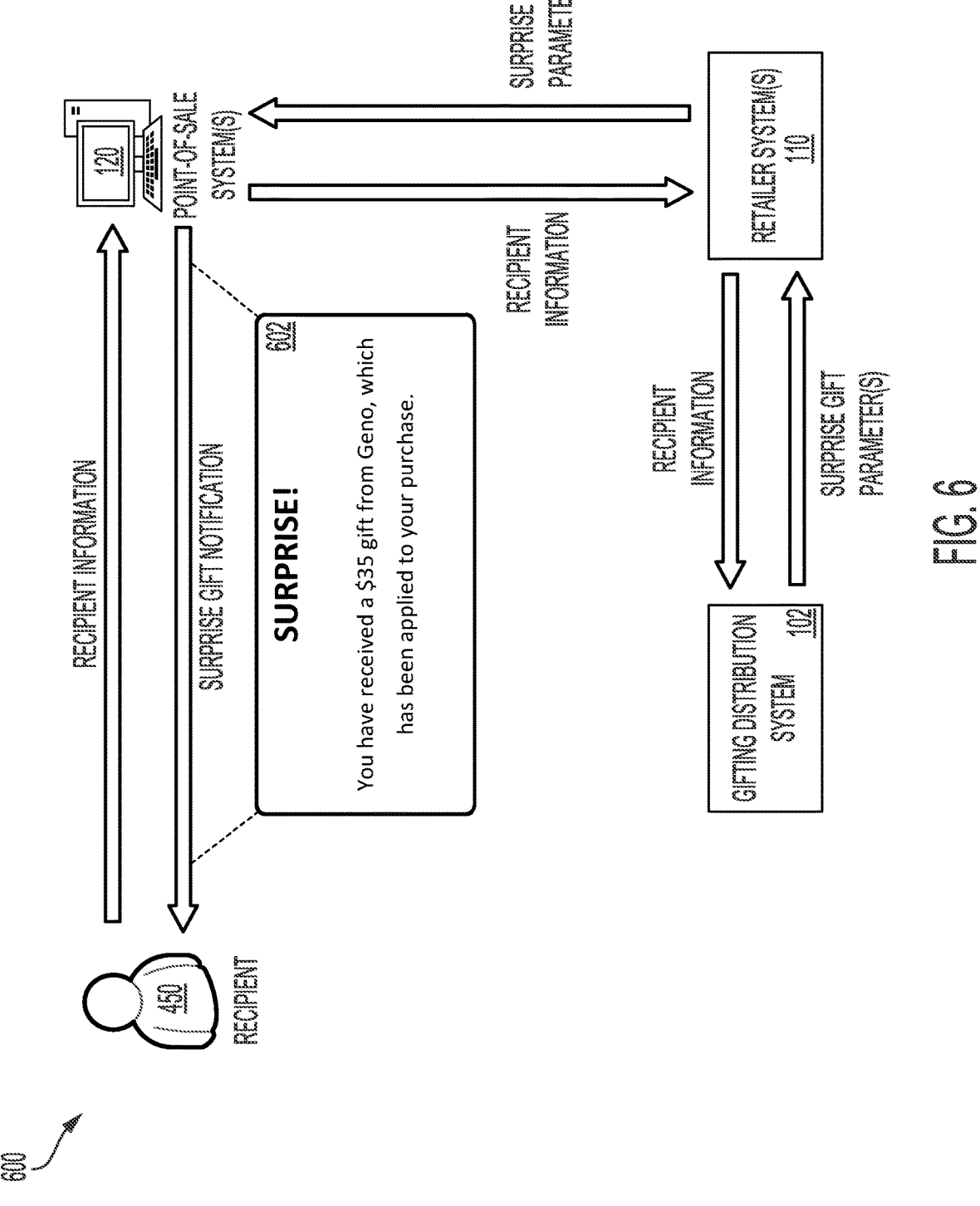
FIG. 6 shows an illustrative example of an environment in which a surprise gift object is presented through one or more point-of-sale systems in response to a real-time transaction associated with a recipient in accordance with at least one embodiment.

FIG. 6 shows an illustrative example of an environment 600 in which a surprise gift object is presented through one or more point-of-sale systems 120 in response to a real-time transaction associated with a recipient 450 in accordance with at least one embodiment. As noted above, a user (e.g., sender of a surprise gift object) may define one or more surprise gift object parameters whereby a surprise gift object is to be automatically presented to the recipient 450 when the recipient 450 engages one or more point-of-sale systems 120 at a point-of-sale location. For instance, the user may indicate, to the gifting distribution system 102, that the surprise gift object is to be presented to the recipient 450 when the recipient 450 engages a self-checkout device at any point-of-sale location associated with a particular retailer. As another illustrative example, the user may indicate, to the gifting distribution system 102, that the surprise gift object is to be presented to the recipient 450 when the recipient 450 requests a bill at any restaurant that implements one or more computing systems through which bills and surprise gift objects may be presented.

In the environment 600, the gifting distribution system 102 may provide, to one or more retailer systems 110 associated with the one or more point-of-sale systems 120 through which surprise gift objects may be presented, the set of surprise gift object parameters as defined by the user (e.g., sender of the surprise gift object). The surprise gift object parameters, as noted above, may include the value of the surprise gift object, any known occasion for provisioning of the surprise gift object, date(s) during which the surprise gift object is being made available, and the like. In some instances, the surprise gift object parameters may define what type(s) of transactions the surprise gift object may be applied to. For instance, a user may indicate that the surprise gift object may be provided only for transactions associated with child-related needs (e.g., children's clothing, children's furniture, toys, diapers, etc.). Alternatively, the user may indicate that the surprise gift object may be provided for any transaction associated with the recipient 450 regardless of the nature of the transaction.

In an embodiment, the point-of-sale systems 120 are configured to automatically prompt users (such as recipient 450) for identifying information that may be used to uniquely identify these users. For instance, when a recipient 450 engages a point-of-sale system 120 at a point-of-sale location, the point-of-sale system 120 may prompt the recipient 450 to provide their electronic mailing address. Additionally, or alternatively, the point-of-sale system 120 may prompt the recipient 450 to provide their loyalty rewards program membership information (e.g., scan a loyalty rewards program card, enter a loyalty rewards program membership number, enter an electronic mail address associated with their membership, enter a telephone number associated with their membership, etc.). In some instances, the point-of-sale system 120 can automatically obtain identifying information associated with the recipient 450 when the recipient 450 uses their payment instrument at the point-of-sale system 120 (e.g., a credit card number, name of the recipient 450, etc.).

When the point-of-sale system 120 obtains identifying information associated with the recipient 450, the point-of-sale system 120, in real-time, may transmit this identifying information to the one or more retailer systems 110. In response to obtaining this identifying information associated with the recipient 450, the one or more retailer systems 110 may query its own datastores to determine whether additional identifying information associated with the recipient 450 is available. For example, if the recipient 450 provides, through the point-of-sale system 120, an account number corresponding to their loyalty rewards program membership, the one or more retailer systems 110 may use this account number to identify a loyalty rewards program membership account associated with the recipient 450. From this account, the one or more retailer systems 110 may retrieve additional information associated with the recipient 450, such as the recipient's name, the recipient's physical address, the recipient's electronic mail address, the recipient's phone number, and the like. This additional information may assist the gifting distribution system 102 to better determine whether a surprise gift object is available to the recipient 450.

The one or more retailer systems 110 may automatically, and in real-time, provide the identifying information associated with the recipient 450 (as obtained from the one or more point-of-sale systems 120 and/or the one or more retailer systems 110) to the gifting distribution system 102. Further, in some instances, the one or more retailer systems 110 may further provide identifying information associated with the point-of-sale system 120. This additional identifying information may include location information associated with the point-of-sale system 120, the time and date of the transaction occurring at the point-of-sale system 120, transaction information associated with the transaction occurring at the point-of-sale system 120, and the like.

In response to obtaining the identifying information associated with the recipient 450 and the point-of-sale system 120, the gifting distribution system 102 may determine whether a surprise gift object is available for the recipient 450 and, if so, whether the surprise gift object may be presented to the recipient 450 through the point-of-sale system 120. For instance, using the obtained information, the gifting distribution system 102 may automatically query a recipient information datastore (e.g., recipient information datastore 212, as described above in connection with FIGS. 2, 3, and 4B) to determine whether the recipient 450 is associated with a pending surprise gift object. If so, the gifting distribution system 102 may determine whether the surprise gift object may be presented to the recipient 450 through the point-of-sale system 120 for the present transaction. For example, if the transaction is occurring on a date or time that does not correspond to the date or range of dates during which the surprise gift object may be provided to the recipient 450, the gifting distribution system 102 may determine that the surprise gift object is currently unavailable to the recipient 450. As another illustrative example, if the transaction is occurring at a point-of-sale location other than a point-of-sale location indicated in the surprise gift object request submitted by the sender of the surprise gift object, the gifting distribution system 102 may determine that the surprise gift object is unavailable through the point-of-sale system 120. In some examples, if the surprise gift object may only be applied for certain types of transactions as described above, the gifting distribution system 102 may evaluate the provided transaction information to determine whether the present transaction corresponds to the certain types of transactions associated with the surprise gift object.

If the present transaction does not correspond to these certain types of transactions, the gifting distribution system 102 may determine that the surprise gift object is not available for the present transaction.

In an embodiment, if the gifting distribution system 102 determines that a surprise gift object is available for the recipient 450 and that the surprise gift object may be presented to the recipient 450 through the point-of-sale system 120, the gifting distribution system 102 transmits the surprise gift object parameters associated with the surprise gift object to the one or more retailer systems 110. The one or more retailer systems 110 may use these surprise gift object parameters to define one or more executable instructions that may be transmitted to the point-of-sale system 120 to present the surprise gift object to the recipient 450. For example, the executable instructions may cause the point-of-sale system 120 to update an interface 602 implemented on the point-of-sale system 120 to indicate that the surprise gift object is available to the recipient 450. As illustrated in FIG. 6, the executable instructions may cause the point-of-sale system 120 to update the interface 602 to provide a greeting that is indicative of the surprise gift object (e.g., "SURPRISE!"), an indication of the monetary value of the surprise gift object (e.g., "$35"), an indication of the sender of the surprise gift object (e.g., "Geno"), and the actions taken in response to the surprise gift object (e.g., application of the $35 gift to the present transaction).

In some instances, the executable instructions may cause the point-of-sale system 120 to provide, through the interface 602, additional options related to the surprise gift object. For example, rather than automatically applying the surprise gift object to the present transaction, the point-of-sale system 120 may provide the recipient 450 with options to apply the surprise gift object to the present transaction, reserve the surprise gift object for a future transaction, convert the surprise gift object into another form (e.g., a gift card, an equivalent amount of cryptocurrency, an equivalent amount of loyalty rewards points, etc.), and the like. This may provide the recipient 450 with additional flexibility with regard to redemption of the surprise gift object through the point-of-sale system 120.

Figure 7:
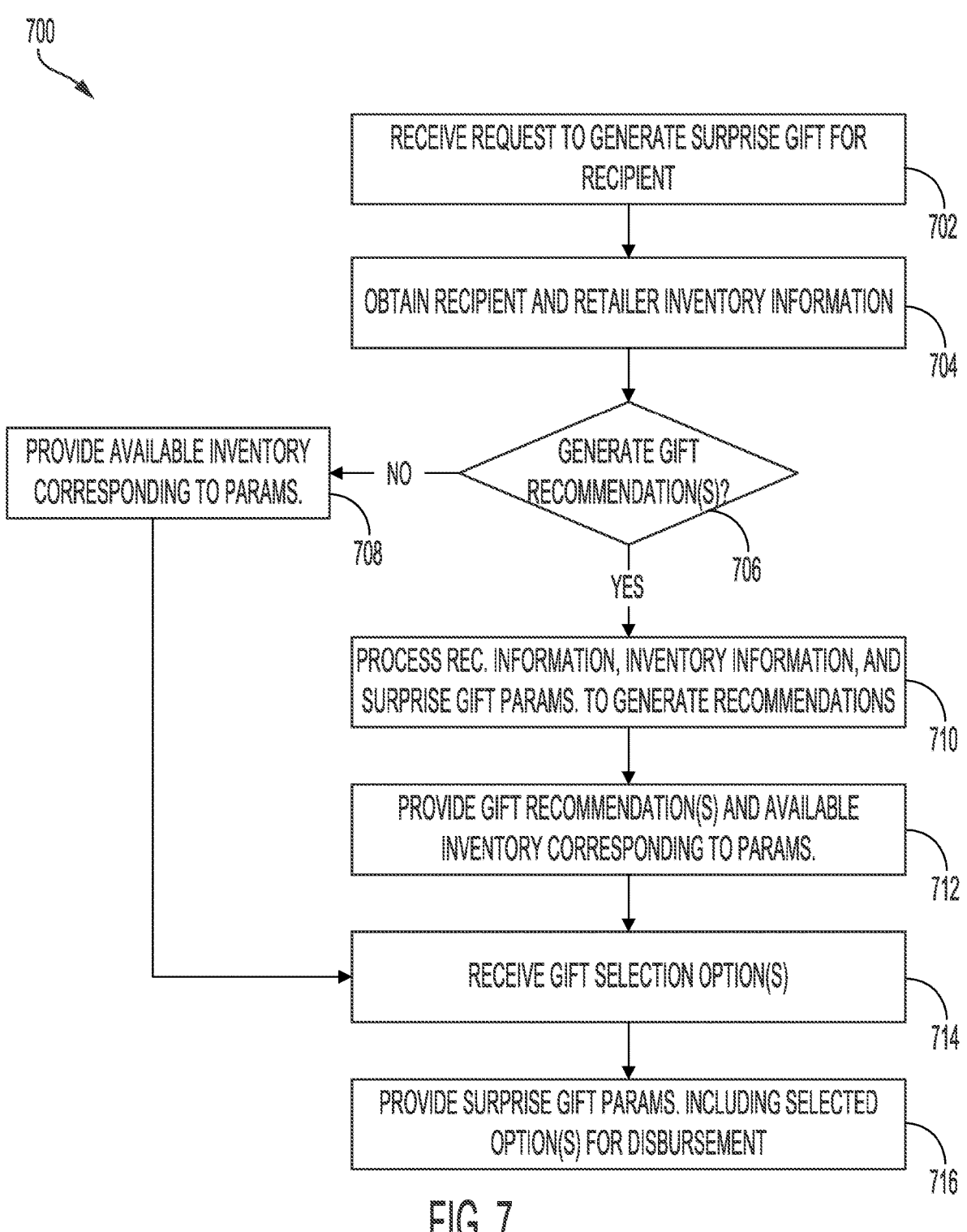
FIG. 7 shows an illustrative example of a process for generating a surprise gift object based on a received request in accordance with at least one embodiment.

FIG. 7 shows an illustrative example of a process 700 for generating a surprise gift object based on a received request in accordance with at least one embodiment. The process 700 may be performed by a surprise gifting sub-system implemented by the gifting distribution system, such as the surprise gifting sub-system described above in connection with FIG. 2. Further, certain operations or steps associated with the process 700 may be performed using a gift recommendation algorithm implemented by a machine learning system associated with the gifting distribution system.

At step 702, the surprise gifting sub-system may receive a request to generate a new surprise gift object for a particular recipient. For example, through a gifting application or other application implemented on a user's computing device, the user may submit a request to the gifting distribution system to generate a new surprise gift object for a particular recipient. In some instances, the user may submit their request to generate a new surprise gift object for a particular recipient through one or more computer systems provided by the gifting distribution system and/or retailer or other entity associated with the gifting distribution system. For example, at a point-of-sale location associated with a particular retailer, the gifting distribution system or retailer may provide a standalone kiosk through which users may submit requests to generate a new surprise gift object for a particular recipient. In some examples, the new surprise gift object request may be submitted through an interface or other process executed on a point-of-sale system implemented at a point-of-sale location. In some instances, the user may submit their request to generate a new surprise gift object for a particular recipient through a gifting application or other application implemented and executed on the user's computing device, as described above.

The surprise gift object request submitted by a user may define a set of parameters and other information that may be used to define the surprise gift object and determine when and how the surprise gift object is to be disbursed to a particular recipient. For instance, a user may define a surprise gift object parameter whereby the selected surprise gift object is to be provided to the recipient at a particular point-of-sale location or other location that the recipient may often frequent and through which surprise gift objects may be made available to the recipient. As another example, the user may define that the surprise gift object may be stored at a point-of-sale location or other location within a surprise gift object storage device, through which the recipient is to be presented with one or more surprise gift object selection options and from which the recipient may select their surprise gift object. Alternatively, the user may define a surprise gift object parameter whereby the surprise gift object is to be automatically presented to the recipient when the recipient engages one or more point-of-sale systems at one or more particular point-of-sale locations. The user may further define, in their request, a date or range of dates during which the surprise gift object may be made available to the recipient. For instance, if the surprise gift object is being purchased for the recipient's birthday, the user may define a surprise gift object parameter corresponding to the recipient's birthday. For example, the user may indicate whether the surprise gift object is to be made available only on the recipient's birthday or within a date range that includes the recipient's birthday. In some instances, the surprise gifting sub-system may automatically define a date range based on any dates provided by the user in their request.

Additionally, in the surprise gift object request, the user may provide identifying information associated with the intended recipient. For instance, the surprise gifting sub-system may prompt the user to provide identifying information corresponding to the recipient (e.g., recipient name, recipient electronic address, recipient physical address, etc.). In some examples, the surprise gifting sub-system may provide the user with various options that may allow the user to define the recipient's name, the recipient's physical address or geographic location, the recipient's electronic mail address, the recipient's demographic information, and the like. In some instances, the surprise gifting sub-system may prompt the user to provide additional information regarding the intended recipient that may be used to provide recommendations corresponding to different gift categories or items that may be of interest to the recipient and that the user may select as possible gift selection options presentable to the intended recipient. For example, the surprise gifting sub-system may prompt the user to indicate any hobbies that the intended recipient is interested in. As another example, the surprise gifting sub-system may prompt the user to indicate if the surprise gift object is being provided in commemoration of a life event associated with the intended recipient. Based on the obtained identifying information, the surprise gifting sub-system may automatically construct a recipient profile associated with the intended recipient.

At step 704, the surprise gifting sub-system may obtain any available recipient and relevant retailer inventory information for creation of the surprise gift object. The recipient information may include the aforementioned recipient information provided by the user in their request or in response to prompting from the surprise gifting sub-system. In some instances, the surprise gifting sub-system may use any provided identifying information associated with the intended recipient to query a recipient information datastore to determine whether the gifting distribution system maintains an existing recipient profile associated with the intended recipient. Through this existing profile, the surprise gifting sub-system may supplement the provided recipient information with any information included therein. In an embodiment, through an existing recipient profile, the surprise gifting sub-system can further obtain historical data corresponding to gift objects previously disbursed to the recipient. Additionally, through the existing recipient profile, the surprise gifting sub-system may determine what gift selection options were previously presented to the recipient and, based on these presented gift selection options, the gift selections made by the recipient (including any selections of alternative gifts, such as a gift card or other items not presented as original gift selection options).

In addition to obtaining this additional recipient information, the surprise gifting sub-system may obtain the real-time product information corresponding to the products that may be available within the point-of-sale locations specified in the surprise gift object request or otherwise associated with a known geographic location of the recipient (e.g., the recipient's physical address, the recipient's most commonly visited point-of-sale locations, etc.). As noted above, the surprise gifting sub-system may automatically, and in real-time, interact with one or more retailer systems associated with one or more retailers to obtain product information associated with the products made available by these one or more retailers through their point-of-sale locations. The product information may include SKUs corresponding to the different products available through these point-of-sale locations and/or through surprise gift object storage devices implemented at these point-of-sale locations or other locations. Further, for each of these SKUs, the one or more retailer systems may provide an indication of the available inventory for the associated product. This product information may be provided independent of any pending surprise gift object requests from users associated with the gifting distribution system. For instance, the one or more retailer systems may automatically, and in real-time, provide product information to the surprise gifting sub-system. Alternatively, the surprise gifting sub-system may automatically, and in real-time, query the one or more retailer systems to obtain the real-time product information associated with the associated point-of-sale locations and/or the surprise gift object storage devices associated with the particular retailer and through which surprise gift objects may be made available. This product information may be cached or otherwise stored in a product information datastore, which may allow the surprise gifting sub-system, in response to a surprise gift object request, to query the product information datastore to obtain the real-time product information corresponding to the products that may be available within the point-of-sale locations and/or the surprise gift object storage devices associated with the particular retailer and through which surprise gift objects may be made available specified in the surprise gift object request.

As noted above, in some instances, the product information provided by the one or more retailer systems may further indicate any products that are reserved for other surprise gift object requests. For instance, while a particular retailer may have a certain amount of inventory available for a particular product at a point-of-sale location, a portion of this amount may have already been allocated or reserved for other surprise gift object disbursements. Accordingly, the surprise gifting sub-system may automatically, and in real-time, use the obtained product information and information corresponding to pending surprise gift object requests to determine the actual inventory available at different point-of-sale locations and/or through surprise gift object storage devices associated with the particular retailer. In some instances, when a surprise gift object request is fulfilled (e.g., a recipient retrieves a surprise gift object from a point-of-sale location or through a surprise gift object storage device, etc.), the one or more retailer systems may automatically update their inventory information and release any inventory previously reserved for the surprise gift object request and that were not selected by the recipient. Thus, the product information obtained by the surprise gifting sub-system may be reflective of the product inventory available to users at the given time and may take into account, in real-time, any inventory that is currently reserved for other surprise gift object requests.

At step 706, the surprise gifting sub-system may determine whether to generate one or more surprise gift object recommendations for the user and for defining the surprise gift object. For instance, in some embodiments, the surprise gifting sub-system can provide, to the user at step 708, a listing or other ordering of the products that may be available through the point-of-sale locations and/or the surprise gift object storage devices where the surprise gift object may be made available to the intended recipient. This listing or other ordering of products may be dynamically generated based on the product information cached or otherwise stored in the product information datastore for the relevant point-of-sale locations and/or other locations where surprise gift object storage devices are implemented to provide surprise gift objects to different recipients. In some instances, the surprise gift object request may indicate that the surprise gift object is to be a specific product or gift card that is to be provided to the recipient. In such instances, the surprise gifting sub-system may not need to provide the user with any surprise gift object recommendations.

If the surprise gifting sub-system determines that it is to generate one or more surprise gift object recommendations to the user for defining the surprise gift object selection options presentable to the intended recipient, the surprise gifting sub-system, at step 710, may process the identifying information associated with the intended recipient, the real-time product information associated with the relevant point-of-sale locations or other locations through which surprise gift objects may be made available (such as through surprise gift object storage devices), and the provided surprise gift object parameters to generate these one or more surprise gift object recommendations. As noted above, the identifying information associated with the intended recipient, the real-time product information, and the provided surprise gift object parameters may be used as input to a gift recommendation algorithm implemented by the surprise gifting sub-system to automatically, and in real-time, generate the one or more surprise gift object recommendations. These one or more surprise gift object recommendations may allow the user to further refine the gift selection options that may be presented to a recipient for their surprise gift object. The surprise gift object recommendations may correspond to different gift categories or items that may be of interest to the recipient and that the user may select as possible gift selection options presentable to the intended recipient. At step 712, the surprise gifting sub-system may provide these one or more surprise gift object recommendations and the real-time product information corresponding to the items that may be available within the point-of-sale locations or through other locations specified in the surprise gift object request and that may be appealing to the intended recipient.

At step 714, the surprise gifting sub-system may receive one or more surprise gift object selection options that are to be presented to the intended recipient at one or more point-of-sale locations or other locations when the surprise gift object is to be made available to the intended recipient. The one or more surprise gift object selection options may correspond to different products that may be presented to a recipient at one or more point-of-sale locations or other locations, such as through a surprise gift object storage device described herein. In an embodiment, the surprise gifting sub-system may evaluate the one or more surprise gift object selections to determine whether the user has adhered to the provided recommendations (e.g., has selected a set of gift selection options recommended by the gift recommendation algorithm, has opted to select an alternative set of gift selection options not recommended by the gift recommendation algorithm, etc.). Based on the adherence (or lack of adherence) to the provided surprise gift object recommendations, the surprise gifting sub-system may dynamically, and in real-time, update the gift recommendation algorithm, as described herein.

At step 716, the surprise gifting sub-system may provide the surprise gift object parameters defined by the user, as well as the selected surprise gift object selection options, for disbursement of the surprise gift object. For instance, the surprise gifting sub-system may transmit the surprise gift object parameters to the one or more retailer systems for fulfillment of the request. For example, if the one or more gift selection options selected by the user are to be stocked within a surprise gift object storage device at a particular point-of-sale location or other location where the surprise gift object storage device is implemented during a pre-defined time period (e.g., a particular set of days, a particular week, etc.), the gifting sub-system may automatically coordinate with the one or more retailer systems such that, during the pre-defined time period, a surprise gift object storage device at the designated point-of-sale location or other location is stocked with the items corresponding to the different surprise gift object selection options defined by the user. Further, the surprise gift object parameters may allow the one or more retailer systems to automatically notify a recipient regarding an available surprise gift object. For instance, the one or more retailer systems may automatically determine when the intended recipient is at the point-of-sale location or other location where the surprise gift object storage device is implemented and through which the surprise gift object is being made available to the recipient (such as through real-time evaluation of location data associated with the recipient) and whether their presence corresponds to the pre-defined time period during which the surprise gift object is made available. If so, the one or more retailer systems may automatically notify the recipient, while the recipient is at the point-of-sale location or other location, of the availability of the surprise gift object.

Figure 8:
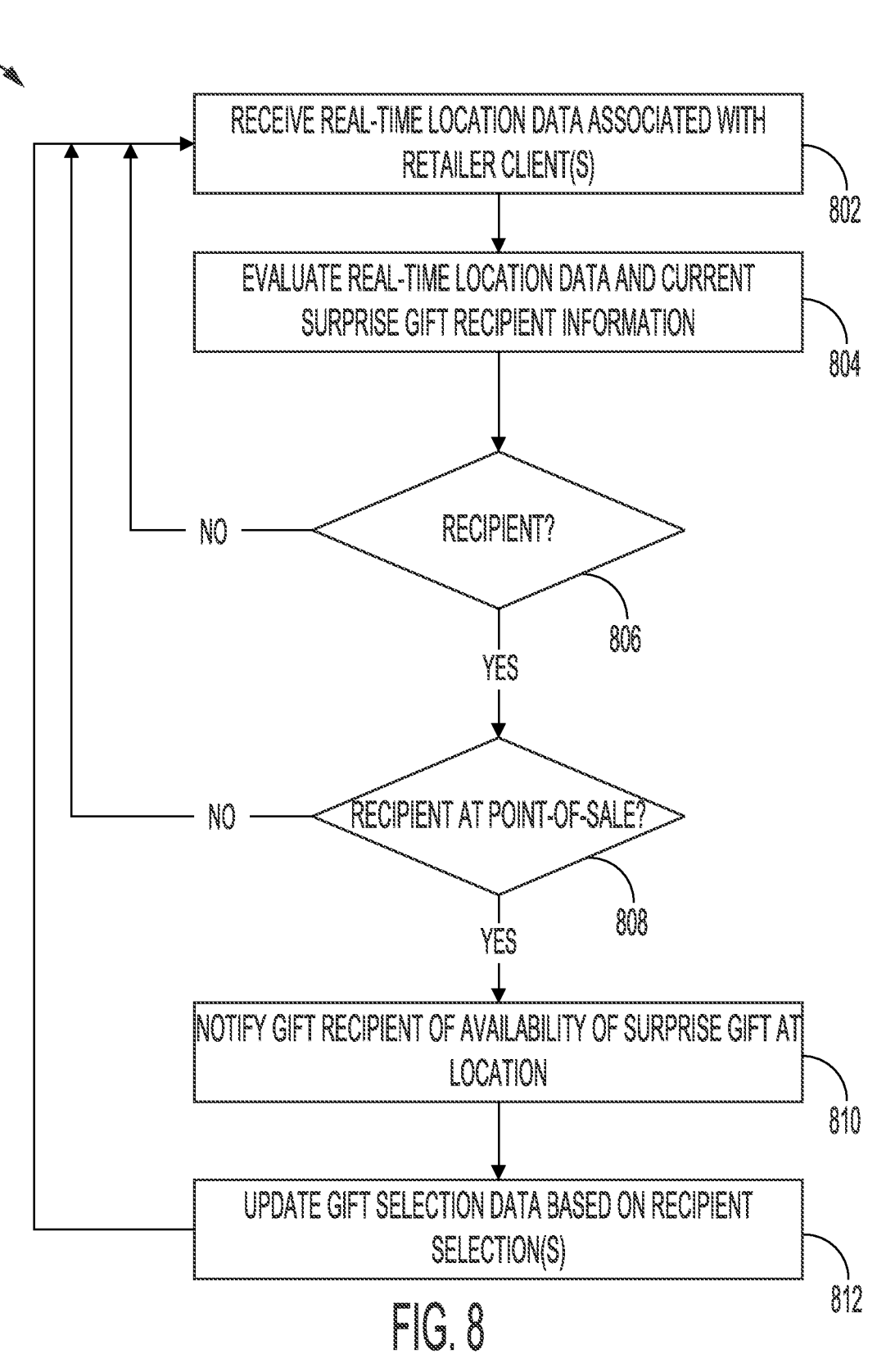
FIG. 8 shows an illustrative example of a process for using real-time location data and current surprise gift object recipient information to notify gift recipients at a location of corresponding surprise gift objects available to the gift recipients in accordance with at least one embodiment.

FIG. 8 shows an illustrative example of a process 800 for using real-time location data and current surprise gift object recipient information to notify gift recipients at a point-of-sale location or other location where surprise gift objects are made available (e.g., surprise gift object storage devices, etc.) of corresponding surprise gift objects available to the gift recipients in accordance with at least one embodiment.

The process 800 may be performed by the surprise gifting sub-system associated with the gifting distribution system, as described above. In some instances, certain steps or operations associated with the process 800 may be performed in conjunction with one or more retailer systems associated with different point-of-sale locations and/or other locations through which surprise gift objects may be made available to recipients upon detection of the recipients' presence in the vicinity of these different point-of-sale locations and/or other locations.

At step 802, the surprise gifting sub-system may receive real-time location data associated with one or more retailer clients. As noted above, one or more retailer systems associated with one or more point-of-sale locations or other locations through which surprise gift objects may be made available (e.g., surprise gift object storage devices maintained by a retailer and implemented at locations other than point-of-sale locations associated with the retailer, etc.) may automatically, and in real-time, obtain location data associated with any clients (e.g., customers, etc.) accessing these point-of-sale locations or other locations. The location data may be provided, automatically and in real-time, through a retailer application implemented on client computing devices (e.g., smartphones, smartwatches, etc.) as the corresponding clients travel within the vicinity of any of the point-of-sale locations and/or other locations associated with the one or more retailer systems. As an illustrative example, if a particular client implements a retailer application on their computing device, the retailer application may continuously attempt to detect one or more point-of-sale systems that may be associated with the retailer and located within a point-of-sale location associated with the retailer. Additionally, or alternatively, the retailer application may continuously attempt to detect any inventory tracking systems associated with surprise gift object storage devices implemented by a retailer at a point-of-sale location or other location. In some instances, the retailer application may automatically obtain location data from one or more other applications or devices implemented on the computing device. For example, when a client executes the retailer application, the retailer application may automatically engage one or more other applications or devices implemented on the computing device to determine the present location of the computing device. In turn, the retailer application may automatically, and in real-time, transmit this location data to the one or more retailer systems. The location data, as noted above, may include GPS location data, IP-based geolocation data, Wi-Fi positioning data, cellular trilateration data, and the like.

In an embodiment, the one or more retailer systems may automatically, and in real-time, transmit the location data associated with these different clients to the surprise gifting sub-system for evaluation. The location data may be provided with identifying information associated with each of these clients. For instance, if the location data is obtained through a retailer application implemented on the client's computing device, the retailer application may further provide identifying information associated with the client. This may include the client's account username, actual name, physical address, electronic mail address, phone number, and the like. In some instances, the retailer application may obtain identifying information associated with the client from other applications implemented on the computing device or from a carrier associated with the computing device (e.g., Internet Service Provider (ISP), mobile cellular carrier, etc.). The one or more retailer systems may use this identifying information to retrieve any other information that may be used to better uniquely identify the client. For example, if the identifying information includes an account username associated with the client, the one or more retailer systems may use the account username to query a corresponding account maintained by the one or more retailer systems to obtain additional information corresponding to the client (e.g., the client's name, the client's physical address, the client's electronic mail address, etc.).

At step 804, the surprise gifting sub-system may evaluate the obtained real-time location data and corresponding client identifying information in conjunction with current surprise gift object recipient information to determine whether the provided information corresponds to an intended recipient for a surprise gift object. For example, using the obtained identifying information associated with a particular client, the surprise gifting sub-system may query a recipient information datastore (e.g., recipient information datastore 212, as described above in connection with FIGS. 2, 3, and 4B) using the obtained identifying information to determine, at step 806, whether the identifying information corresponds to a particular recipient for which a surprise gift object has been purchased. If the obtained identifying information does not correspond to a particular recipient for which a surprise gift object has been purchased, the surprise gifting sub-system may continue to process, in real-time, new location data and corresponding identifying information associated with different retailer clients associated with the one or more retailer systems, thereby restarting the process 800.

If the surprise gifting sub-system determines that the obtained identifying information does correspond to a particular recipient for which a surprise gift object has been made available, the surprise gifting sub-system, at step 808, may determine whether the recipient is at a designated location through which the surprise gift object may be made available (e.g., a point-of-sale location, a location where a surprise gift object storage device is implemented and through which the surprise gift object is to be provided, etc.). For instance, using the obtained location data associated with the recipient, the surprise gifting sub-system may determine whether the recipient is within the vicinity of a point-of-sale location or other location designated as being a location through which the surprise gift object may be provided. As noted above, a recipient may be associated with multiple surprise gift objects that may be associated with different locations (e.g., point-of-sale locations, other locations where surprise gift objects may be provided through surprise gift object storage devices, etc.) and with different retailers. Accordingly, the surprise gifting sub-system may query the recipient information datastore using the provided location data and known recipient identifying information to determine whether the recipient has an available surprise gift object at a location where the recipient may be currently at. If the recipient is not at a location where a surprise gift object may be provided, the surprise gifting sub-system may continue to process, in real-time, new location data and corresponding identifying information associated with different retailer clients associated with the one or more retailer systems, thereby restarting the process 800.

As noted above, if a recipient opts to not retrieve their surprise gift object from a point-of-sale location or other indicated location where the surprise gift object may be made available to the recipient, the surprise gifting sub-system may transmit a notification to the one or more retailer systems to release any product inventory holds corresponding to the surprise gift object such that any products made available to the recipient for selection as their surprise gift object may be released and made available for other surprise gift object requests. While a particular retailer may have a certain amount of inventory available for a particular product at a point-of-sale location, a portion of this amount may be reserved for other surprise gift object disbursements. This information may be used by the surprise gifting sub-system to determine the actual inventory available at different point-of-sale locations and/or through surprise gift object storage devices associated with the particular retailer. Thus, if the recipient has opted to not retrieve the surprise gift object reserved for them, the one or more retailer systems may release any previously reserved products associated with this surprise gift object. This may result in the surprise gifting sub-system obtaining an updated, and real-time, product inventory resulting from the release of these reserved products.

In an embodiment, if the surprise gifting sub-system determines that the recipient is at or in the vicinity of a location through which a surprise gift object may be made available (e.g., a point-of-sale location, a location where a surprise gift object storage device is implemented and through which the surprise gift object is made available, etc.), the surprise gifting sub-system, at step 810, notifies the recipient to indicate that a surprise gift object is available at the location. For instance, in order to notify the recipient of an available surprise gift object, the surprise gifting sub-system may transmit a notification to the one or more retailer systems associated with the particular location to indicate that the surprise gift object is to be made available to the user. Further, the surprise gifting sub-system or the one or more retailer systems may notify the recipient of the availability of the surprise gifting object at the location. For example, the surprise gifting sub-system and/or one or more retailer systems may transmit one or more executable instructions to a retailer application associated with the retailer making the surprise gift object available to the recipient at the indicated location (e.g., a point-of-sale location, a location at which a surprise gift object storage device is implemented, etc.) or to another application implemented on the recipient's computing device to notify the recipient, through the recipient device, of the surprise gift object. As an illustrative example, as the recipient enters the location, the retailer application or other application implemented on the recipient's computing device may issue a notification indicating that the recipient has received a surprise gift object that is available at the location. If the surprise gift object is stored within a surprise gift object storage device at the location, the notification may include a unique identifier corresponding to the particular surprise gift object storage device that is used to store the surprise gift object, any unique codes or passwords required to access the surprise gift object storage device, the entity that provided the surprise gift object (e.g., the user, etc.), and the like.

In an embodiment, the surprise gifting sub-system and/or the one or more retailer systems can notify the sender of the surprise gift object to indicate that the recipient is at the location where the surprise gift object is to be made available to the recipient. For instance, the surprise gifting sub-system may transmit a notification to the sender through a gifting application or other application implemented on their computing device to indicate that the recipient is at the indicated location and/or has been notified of the availability of their surprise gift object. This may allow the sender to contact the recipient to further enhance the element of surprise with regard to the retrieval of the surprise gift object.

At step 812, the surprise gifting sub-system may update the surprise gift object selection data based on any recipient selections made at the location for their surprise gift object. As noted above, when the recipient, at the designated location, obtains their surprise gift object, the location (through one or more point-of-sale systems implemented at the location, through an inventory tracking system implemented within a surprise gift object storage device through which the surprise gift object was made available, etc.) may transmit, in real-time, data corresponding to the surprise gift object obtained by the recipient to the machine learning system associated with the surprise gifting sub-system. As noted above, if the machine learning system provides the recipient with a set of surprise gift object recommendations, the one or more systems associated with the location may transmit data corresponding to the recipient's selection of a particular surprise gift object selection option (e.g., a selection option provided through a recommendation, an alternative selection option independently selected by the recipient, conversion to a gift card, conversion to a cryptocurrency, etc.) to the machine learning system. As another illustrative example, if the recipient is provided with a set of pre-defined surprise gift object selection options through a surprise gift object storage device (e.g., options selected by a sender of the surprise gift object, options curated by a gift curator or other expert, etc.), the systems associated with the location may determine whether the recipient has selected one or more products from the options provided to the recipient or has opted to obtain an alternative gift object (e.g., a gift card, a product not included in the set of options, a conversion of the gift value to a cryptocurrency, a conversion of the gift value to a loyalty rewards amount, etc.). The machine learning system may, in real-time and as the selection is made by the recipient, evaluate the recipient's selection according to the original surprise gift object parameters and the recipient profile associated with the recipient to update the gift recommendation algorithm, as described above.

As illustrated in FIG. 8, the process 800 may be continuous, whereby the surprise gifting sub-system may continue to process real-time location data associated with different retailer clients associated with one or more retail systems to determine whether surprise gift objects are available to any of these different retailer clients. It should be noted that while some of the operations or steps associated with the process 800 are described as being performed for a singular recipient, these particular operations or steps may be performed in real-time and in parallel for different recipients as they are identified by the surprise gifting sub-system. This may minimize the delay in providing recipients with their surprise gift objects upon detection of the availability of these surprise gift objects at different locations where these recipients may be located at the time. Further, this may ensure the timely delivery of surprise gift objects to these recipients across any number of different locations associated with myriad retailers and corresponding retailer systems.

FIG. 9 shows an illustrative example of a process 900 for providing a surprise gift object through one or more point-of-sale systems in real-time during a transaction associated with a surprise gift object recipient in accordance with at least one embodiment. The process 900 may be performed by the surprise gifting sub-system associated with the gifting distribution system, as described above. In some instances, certain steps or operations associated with the process 900 may be performed in conjunction with one or more retailer systems associated with different point-of-sale locations through which surprise gift objects may be made available to recipients during pending transactions associated with point-of-sale systems implemented at these different point-of-sale locations.

At step 902, the surprise gifting sub-system may receive recipient information associated with a pending point-of-sale transaction. The pending point-of-sale transaction may be occurring through one or more point-of-sale systems associated with a particular point-of-sale location. As noted above, in some instances, point-of-sale systems implemented at different point-of-sale locations may be configured to automatically prompt users for identifying information that may be used to uniquely identify these users. For instance, when a recipient engages a point-of-sale system at a point-of-sale location, the point-of-sale system may prompt the recipient to provide their electronic mailing address. Additionally, or alternatively, the point-of-sale system may prompt the recipient to provide their loyalty rewards program membership information (e.g., scan a loyalty rewards program card, enter a loyalty rewards program membership number, enter an electronic mail address associated with their membership, enter a telephone number associated with their membership, etc.). In some instances, the point-of-sale system can automatically obtain identifying information associated with the recipient when the recipient uses their payment instrument at the point-of-sale system (e.g., a credit card number, name of the recipient, etc.). When the point-of-sale system obtains identifying information associated with the recipient, the point-of-sale system, in real-time, may transmit this identifying information to the one or more retailer systems. This may allow the one or more retailer systems to evaluate the provided identifying information to obtain any additional information associated with the recipient that may be used to supplement the provided identifying information, as described above. Further, the one or more retailer systems may automatically, and in real-time, provide this identifying information to the surprise gifting sub-system.

At step 904, the surprise gifting sub-system may evaluate the obtained identifying information associated with the recipient, as well as any identifying information associated with the point-of-sale transaction (e.g., identifier corresponding to the point-of-sale system, location data corresponding to the point-of-sale system, retailer information, transaction type, products or items associated with the transaction, the time and date of the transaction occurring at the point-of-sale system, etc.), to determine whether there is a pending surprise gift object for the recipient. For instance, using the obtained information, the surprise gifting sub-system may automatically determine whether the recipient is associated with a pending surprise gift object. If so, the surprise gifting sub-system may determine whether the surprise gift object may be presented to the recipient through the point-of-sale system for the present transaction. For example, if the transaction is occurring on a date or time that does not correspond to the date or range of dates during which the surprise gift object may be provided to the recipient, the surprise gifting sub-system may determine that the surprise gift object is currently unavailable to the recipient. As another illustrative example, if the transaction is occurring at a point-of-sale location other than a point-of-sale location indicated in the surprise gift object request submitted by the sender of the surprise gift object, the surprise gifting sub-system may determine that the surprise gift object is unavailable through the point-of-sale system. In some examples, if the surprise gift object may only be applied for certain types of transactions, the surprise gifting sub-system may evaluate the provided transaction information to determine whether the present transaction corresponds to the certain types of transactions associated with the surprise gift object. If the present transaction does not correspond to these certain types of transactions, the surprise gifting sub-system may determine that the surprise gift object is not available for the present transaction.

If the pending point-of-sale transaction does not qualify for a surprise gift object based on the evaluation described above, the surprise gifting sub-system may continue to receive recipient information associated with other point-of-sale transactions as these transactions occur, thereby restarting the process 900. The pending transaction previously evaluated by the surprise gifting sub-system may be allowed to be completed without notification to the recipient of a surprise gift object, as the transaction could not be associated with a pending surprise gift object.

If the current pending transaction is associated with a pending surprise gift object (e.g., the recipient is associated with a surprise gift object that is designated for presentation at the point-of-sale location for the pending transaction, etc.), the surprise gifting sub-system, at step 906, may provide information corresponding to the surprise gift object for presentation with the current point-of-sale transaction. For instance, the surprise gifting sub-system may transmit the surprise gift object parameters associated with the surprise gift object to the one or more retailer systems. The one or more retailer systems may use these surprise gift object parameters to define one or more executable instructions that may be transmitted to the point-of-sale system to present the surprise gift object to the recipient. For example, the executable instructions may cause the point-of-sale system to update an interface implemented on the point-of-sale system to indicate that the surprise gift object is available to the recipient.

As noted above, in some instances, the executable instructions may cause the point-of-sale system to provide, through the interface, additional options related to the surprise gift object. For example, rather than automatically applying the surprise gift object to the present transaction, the point-of-sale system may provide the recipient with options to apply the surprise gift object to the present transaction, reserve the surprise gift object for a future transaction, convert the surprise gift object into another form (e.g., a gift card, an equivalent amount of cryptocurrency, an equivalent amount of loyalty rewards points, etc.), and the like. Based on the recipient's response to these options, the surprise gifting sub-system, at step 908, may determine whether the surprise gift object was applied to the present transaction.

If the surprise gifting sub-system determines that the surprise gift object was not applied to the current transaction, the surprise gifting sub-system, at step 910, may update the dataset used to dynamically, and in real-time, train the gift recommendation algorithm (e.g., gift recommendation algorithm 210, as described above in connection with FIGS. 2, 3, and 4A-4B) to indicate the alternative option selected by the recipient for application of the surprise gift object. As noted above, if the recipient selects an alternative gift selection option (e.g., the recipient opts to obtain a gift card in lieu of applying the surprise gift object to the present transaction, the recipient opts to apply the surprise gift object to a different transaction at a different point-of-sale location, etc.), the surprise gifting sub-system may evaluate the recipient's selection of the alternative gift selection option to determine whether the selection corresponds to a previously provided surprise gift object recommendation that was not adhered to by the sender of the surprise gift object. If the recipient's selection corresponds to a previously provided surprise gift object recommendation that was not adhered to by the sender of the surprise gift object, the surprise gifting sub-system may determine that the provided surprise gift object recommendation was accurate and update the gift recommendation algorithm accordingly. However, if the recipient's selection does not correspond to a previously provided surprise gift object recommendation, the surprise gifting sub-system may dynamically, and in real-time, update the dataset used to generate the clusters for the gift recommendation algorithm to cause the gift recommendation algorithm to perform a re-clustering of the dataset.

If the recipient applies the surprise gift object to the present transaction, the surprise gifting sub-system, at step 912, may update the dataset used to dynamically, and in real-time, train the gift recommendation algorithm to indicate the recipient's acceptance of the surprise gift object for the present transaction. For instance, if the recipient applies the surprise gift object to the present point-of-sale transaction, the surprise gifting sub-system may determine that the surprise gift object provided by the sender was appropriate for the recipient and their transaction. If surprise gift object was provided based on a set of recommendations previously provided by the surprise gifting sub-system to the sender, this may serve as positive feedback with regard to the recommendations previously provided to the sender. This may allow the surprise gifting sub-system to dynamically, and in real-time, re-train the gift recommendation algorithm based on the sender's adherence to the provided recommendations.

Figure 10:
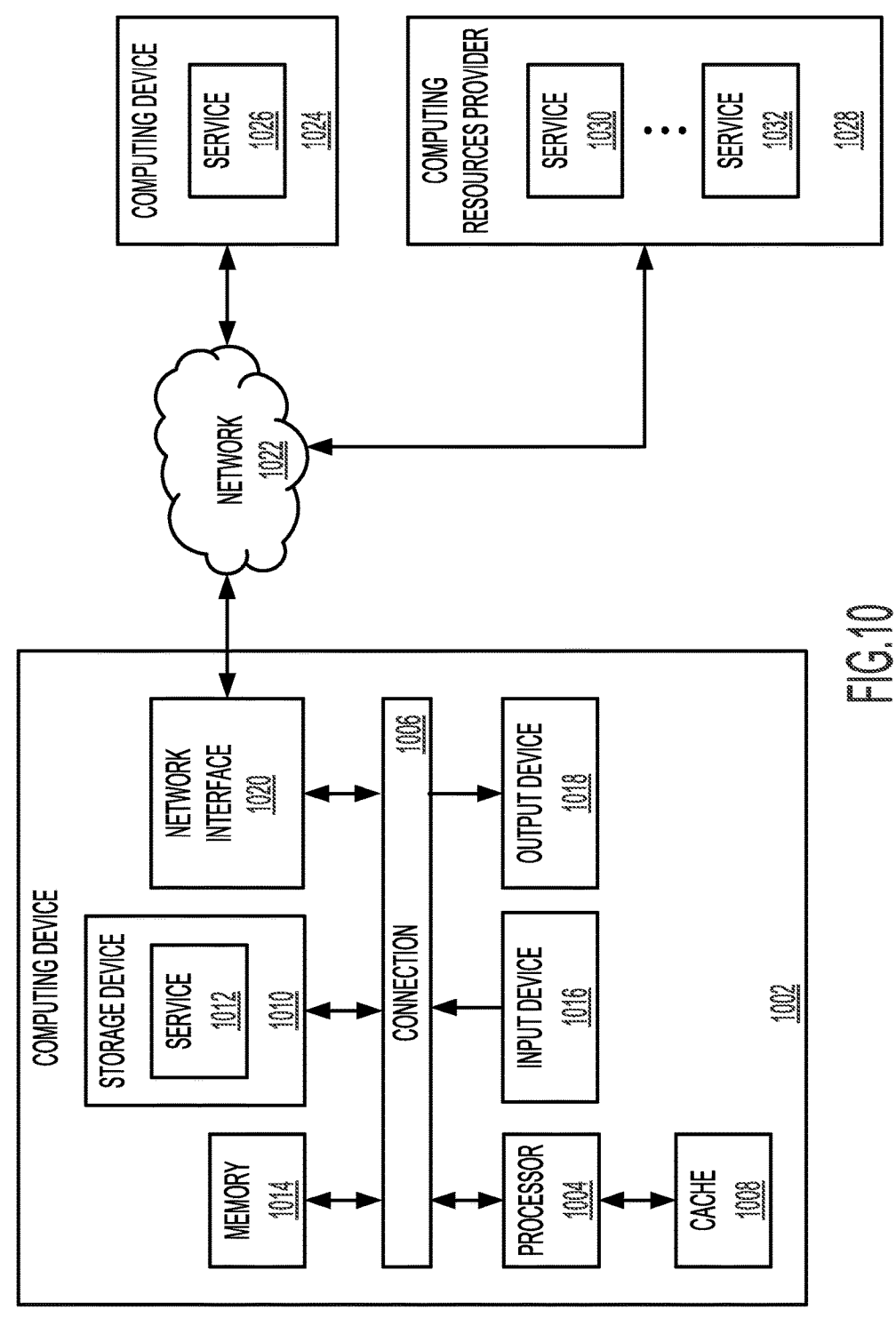
FIG. 10 shows a computing system architecture including various components in electrical communication with each other using a connection in accordance with various embodiments.

FIG. 10 illustrates a computing system architecture 1000, including various components in electrical communication with each other, in accordance with some embodiments. The example computing system architecture 1000 illustrated in FIG. 10 includes a computing device 1002, which has various components in electrical communication with each other using a connection 1006, such as a bus, in accordance with some implementations. The example computing system architecture 1000 includes a processing unit 1004 that is in electrical communication with various system components, using the connection 1006, and including the system memory 1014. In some embodiments, the system memory 1014 includes read-only memory (ROM), random-access memory (RAM), and other such memory technologies including, but not limited to, those described herein. In some embodiments, the example computing system architecture 1000 includes a cache 1008 of high-speed memory connected directly with, in close proximity to, or integrated as part of the processor 1004. The system architecture 1000 can copy data from the memory 1014 and/or the storage device 1010 to the cache 1008 for quick access by the processor 1004. In this way, the cache 1008 can provide a performance boost that decreases or eliminates processor delays in the processor 1004 due to waiting for data. Using modules, methods and services such as those described herein, the processor 1004 can be configured to perform various actions. In some embodiments, the cache 1008 may include multiple types of cache including, for example, level one (L1) and level two (L2) cache. The memory 1014 may be referred to herein as system memory or computer system memory. The memory 1014 may include, at various times, elements of an operating system, one or more applications, data associated with the operating system or the one or more applications, or other such data associated with the computing device 1002.

Other system memory 1014 can be available for use as well. The memory 1014 can include multiple different types of memory with different performance characteristics. The processor 1004 can include any general purpose processor and one or more hardware or software services, such as service 1012 stored in storage device 1010, configured to control the processor 1004 as well as a special-purpose processor where software instructions are incorporated into the actual processor design. The processor 1004 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1004 can be a microprocessor, a microcontroller, a digital signal processor ("DSP"), or a combination of these and/or other types of processors. In some embodiments, the processor 1004 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1000, an input device 1016 can represent any number of input mechanisms, such as a microphone for speech, a touch-sensitive screen for gesture or graphical input, keyboard, mouse, motion input, pen, and other such input devices. An output device 1018 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1000. In some embodiments, the input device 1016 and/or the output device 1018 can be coupled to the computing device 1002 using a remote connection device such as, for example, a communication interface such as the network interface 1020 described herein. In such embodiments, the communication interface can govern and manage the input and output received from the attached input device 1016 and/or output device 1018. As may be contemplated, there is no restriction on operating on any particular hardware arrangement and accordingly the basic features here may easily be substituted for other hardware, software, or firmware arrangements as they are developed.

In some embodiments, the storage device 1010 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1010 can include hardware and/or software services such as service 1012 that can control or configure the processor 1004 to perform one or more functions including, but not limited to, the methods, processes, functions, systems, and services described herein in various embodiments. In some embodiments, the hardware or software services can be implemented as modules. As illustrated in example computing system architecture 1000, the storage device 1010 can be connected to other parts of the computing device 1002 using the system connection 1006. In an embodiment, a hardware service or hardware module such as service 1012, that performs a function can include a software component stored in a non-transitory computer-readable medium that, in connection with the necessary hardware components, such as the processor 1004, connection 1006, cache 1008, storage device 1010, memory 1014, input device 1016, output device 1018, and so forth, can carry out the functions such as those described herein.

The disclosed processes for generating surprise gift objects presentable to intended recipients based on real-time location data associated with the recipients can be performed using a computing system such as the example computing system illustrated in FIG. 10, using one or more components of the example computing system architecture 1000. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for generating surprise gift objects presentable to intended recipients based on real-time location data associated with the recipients described herein by, for example, executing code using a processor such as processor 1004 wherein the code is stored in memory such as memory 1014 as described herein. One or more of a user device, a provider server or system, a database system, or other such devices, services, or systems may include some or all of the components of the computing system such as the example computing system illustrated in FIG. 10, using one or more components of the example computing system architecture 1000 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1028. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1004 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1014 can be coupled to the processor 1004 by, for example, a connector such as connector 1006, or a bus. As used herein, a connector or bus such as connector 1006 is a communications system that transfers data between components within the computing device 1002 and may, in some embodiments, be used to transfer data between computing devices. The connector 1006 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1014 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1014 can also include magnetic or optical data storage media including read-only (e.g., CD ROM and DVD ROM) or otherwise (e.g., CD or DVD). The memory can be local, remote, or distributed.

As described above, the connector 1006 (or bus) can also couple the processor 1004 to the storage device 1010, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1010. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1006 can also couple the processor 1004 to a network interface device such as the network interface 1020. The interface can include one or more of a modem or other such network interfaces including, but not limited to those described herein. It will be appreciated that the network interface 1020 may be considered to be part of the computing device 1002 or may be separate from the computing device 1002. The network interface 1020 can include one or more of an analog modem, Integrated Services Digital Network (ISDN) modem, cable modem, token ring interface, satellite transmission interface, or other interfaces for coupling a computer system to other computer systems. In some embodiments, the network interface 1020 can include one or more input and/or output (I/O) devices. The I/O devices can include, by way of example but not limitation, input devices such as input device 1016 and/or output devices such as output device 1018. For example, the network interface 1020 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1002 can be connected to one or more additional computing devices such as computing device 1024 via a network 1022 using a connection such as the network interface 1020. In such embodiments, the computing device 1024 may execute one or more services 1026 to perform one or more functions under the control of, or on behalf of, programs and/or services operating on computing device 1002. In some embodiments, a computing device such as computing device

1024 may include one or more of the types of components as described in connection with computing device 1002 including, but not limited to, a processor such as processor 1004, a connection such as connection 1006, a cache such as cache 1008, a storage device such as storage device 1010, memory such as memory 1014, an input device such as input device 1016, and an output device such as output device 1018. In such embodiments, the computing device 1024 can carry out the functions such as those described herein in connection with computing device 1002. In some embodiments, the computing device 1002 can be connected to a plurality of computing devices such as computing device 1024, each of which may also be connected to a plurality of computing devices such as computing device 1024. Such an embodiment may be referred to herein as a distributed computing environment.

The network 1022 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1022 can be wired connections, wireless connections, or combinations thereof. Communications via the network 1022 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1022, within the computing device 1002, within the computing device 1024, or within the computing resources provider 1028 can include information, which also may be referred to herein as content. The information may include text, graphics, audio, video, haptics, and/or any other information that can be provided to a user of the computing device such as the computing device 1002. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1002 and presented to a user of the computing device 1002 using forms that are perceptible via sight, sound, smell, taste, touch, or other such mechanisms. In some embodiments, communications over the network 1022 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1002 and/or the computing device 1024 can be connected to a computing resources provider 1028 via the network 1022 using a network interface such as those described herein (e.g. network interface 1020). In such embodiments, one or more systems (e.g., service 1030 and service 1032) hosted within the computing resources provider 1028 (also referred to herein as within "a computing resources provider environment") may execute one or more services to perform one or more functions under the control of, or on behalf of, programs and/or services operating on computing device 1002 and/or computing device 1024. Systems such as service 1030 and service 1032 may include one or more computing devices such as those described herein to execute computer code to perform the one or more functions under the control of, or on behalf of, programs and/or services operating on computing device 1002 and/or computing device 1024.

For example, the computing resources provider 1028 may provide a service, operating on service 1030 to store data for the computing device 1002 when, for example, the amount of data that the computing device 1002 exceeds the capacity of storage device 1010. In another example, the computing resources provider 1028 may provide a service to first instantiate a virtual machine (VM) on service 1032, use that VM to access the data stored on service 1032, perform one or more operations on that data, and provide a result of those one or more operations to the computing device 1002. Such operations (e.g., data storage and VM instantiation) may be referred to herein as operating "in the cloud," "within a cloud computing environment," or "within a hosted virtual machine environment," and the computing resources provider 1028 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1028 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1030 and service 1032 may implement versions of various services (e.g., the service 1012 or the service 1026) on behalf of, or under the control of, computing device 1002 and/or computing device 1024. Such implemented versions of various services may involve one or more virtualization techniques so that, for example, it may appear to a user of computing device 1002 that the service 1012 is executing on the computing device 1002 when the service is executing on, for example, service 1030. As may also be contemplated, the various services operating within the computing resources provider 1028 environment may be distributed among various systems within the environment as well as partially distributed onto computing device 1024 and/or computing device 1002.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1002) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose micropro-cessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, micro-controller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "com-puter-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, for-warded, or transmitted via any suitable means including memory sharing, message passing, token passing, network transmission, or the like. Further examples of machine-readable storage media, machine-readable media, or com-puter-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representa-tions of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities. Usually, though not necessarily, these quantities take the form of electrical or magnetic signals capable of being stored, trans-ferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 7-9). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1002.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein,"

"above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
receiving a request to generate a surprise gift object, wherein the request includes identifying information associated with a recipient and defines one or more physical locations through which the surprise gift object is to be made available, and wherein the surprise gift object is associated with a set of gift options made available through the one or more physical locations;
automatically engaging one or more devices implemented on a recipient device to continuously obtain location data corresponding to the recipient device, wherein the location data is selected from a group consisting of Global Positioning System data, Internet Protocol (IP)-based geolocation data, Wi-Fi position data, and cellular trilateration data;
continuously processing, in real-time, the location data to detect recipient proximity to a physical location associated with the one or more physical locations;
identifying an initial inventory of the set of gift options available at the physical location, wherein the initial inventory is identified through an inventory tracking system associated with the physical location;
updating an interface associated with the recipient device to present a notification to indicate an availability of the surprise gift object and the set of gift options;
dynamically monitoring changes to the initial inventory as different recipients select different gift options from the set of gift options at the physical location and as the set of gift options is restocked at the physical location;

updating the interface as the changes to the initial inventory occur, wherein the interface is updated to provide an updated set of gift options available at the physical location; and
detecting selection of a gift option from the updated set of gift options through the physical location, wherein when the gift selection option is selected at the physical location, an indication that the surprise gift object has been delivered is provided.

2. The computer-implemented method of claim 1, wherein the set of gift options is provided through a surprise gift object storage device implemented at the physical location, and wherein the availability is associated with the surprise gift object storage device.

3. The computer-implemented method of claim 1, further comprising:
automatically detecting a newly unavailable gift option from the set of gift options based on the changes to the initial inventory; and
dynamically updating the interface to remove a set of interface elements corresponding to the newly unavailable gift option.

4. The computer-implemented method of claim 1, wherein the request further defines a range of dates during which the surprise gift object is to be available, and wherein the location data is continuously processed within the range of dates to detect the recipient proximity to the physical location.

5. The computer-implemented method of claim 1, further comprising:
providing an option to convert the surprise gift object to a monetary value, wherein the option is provided through the interface in conjunction with the set of gift options.

6. The computer-implemented method of claim 1, further comprising:
processing the identifying information associated with the recipient and a set of surprise gift object parameters through a gift recommendation algorithm to generate a gift option recommendation, wherein the gift recommendation algorithm is trained using a dataset of sample recipient profiles and sample surprise gift object requests; and
providing the gift option recommendation; and
re-training the gift recommendation algorithm based on the selection of the gift option.

7. The computer-implemented method of claim 1, further comprising:
detecting addition of a new gift option available at the physical location, wherein the addition is detected through monitoring of the changes to the initial inventory; and
dynamically updating the interface to present the new gift option.

8. A system, comprising:
one or more processors; and
memory storing thereon instructions that, as a result of being executed by the one or more processors, cause the system to:
receive a request to generate a surprise gift object, wherein the request includes identifying information associated with a recipient and defines one or more physical locations through which the surprise gift object is to be made available, and wherein the surprise gift object is associated with a set of gift options made available through the one or more physical locations;

automatically engage one or more devices implemented on a recipient device to continuously obtain location data corresponding to the recipient device, wherein the location data is selected from a group consisting of Global Positioning System data, Internet Protocol (IP)-based geolocation data, Wi-Fi position data, and cellular trilateration data;

continuously process, in real-time, the location data to detect recipient proximity to a physical location associated with the one or more physical locations;

identify an initial inventory of the set of gift options available at the physical location, wherein the initial inventory is identified through an inventory tracking system associated with the physical location;

update an interface associated with the recipient device to present a notification to indicate an availability of the surprise gift object and the set of gift options;

dynamically monitor changes to the initial inventory as different recipients select different gift options from the set of gift options at the physical location and as the set of gift options is restocked at the physical location;

update the interface as the changes to the initial inventory occur, wherein the interface is updated to provide an updated set of gift options available at the physical location; and detect selection of a gift option from the updated set of gift options through the physical location, wherein when the gift option is selected at the physical location, an indication that the surprise gift object has been delivered is provided.

9. The system of claim 8, wherein the set of gift options is provided through a surprise gift object storage device implemented at the physical location, and wherein the availability is associated with the surprise gift object storage device.

10. The system of claim 8, wherein the instructions further cause the system to:

automatically detect a newly unavailable gift option from the set of gift options based on the changes to the initial inventory; and dynamically update the interface to remove a set of interface elements corresponding to the newly unavailable gift option.

11. The system of claim 8, wherein the request further defines a range of dates during which the surprise gift object is to be available, and wherein the location data is continuously processed within the range of dates to detect the recipient proximity to the physical location.

12. The system of claim 8, wherein the instructions further cause the system to:

provide an option to convert the surprise gift object to a monetary value, wherein the option is provided through the interface in conjunction with the set of gift options.

13. The system of claim 8, wherein the instructions further cause the system to:

process the identifying information associated with the recipient and a set of surprise gift object parameters through a gift recommendation algorithm to generate a gift option recommendation, wherein the gift recommendation algorithm is trained using a dataset of sample recipient profiles and sample surprise gift object requests; and provide the gift option recommendation; and re-train the gift recommendation algorithm based on the selection of the gift option.

14. The system of claim 8, wherein the instructions further cause the system to:

detect addition of a new gift option available at the physical location, wherein the addition is detected through monitoring of the changes to the initial inventory; and dynamically update the interface to present the new gift option.

15. A non-transitory, computer-readable storage medium storing thereon executable instructions that, as a result of being executed by one or more processors of a computer system, cause the computer system to:

receive a request to generate a surprise gift object, wherein the request includes identifying information associated with a recipient and defines one or more physical locations through which the surprise gift object is to be made available, and wherein the surprise gift object is associated with a set of gift options made available through the one or more physical locations;

automatically engage one or more devices implemented on a recipient device to continuously obtain location data corresponding to the recipient device, wherein the location data is selected from a group consisting of Global Positioning System data, Internet Protocol (IP)-based geolocation data, Wi-Fi position data, and cellular trilateration data;

continuously process, in real-time, the location data to detect recipient proximity to a physical location associated with the one or more physical locations;

identify an initial inventory of the set of gift options available at the physical location, wherein the initial inventory is identified through an inventory tracking system associated with the physical location;

update an interface associated with the recipient device to present a notification to indicate an availability of the surprise gift object and the set of gift options;

dynamically monitor changes to the initial inventory as different recipients select different gift options from the set of gift options at the physical location and as the set of gift options is restocked at the physical location;

update the interface as the changes to the initial inventory occur, wherein the interface is updated to provide an updated set of gift options available at the physical location; and detect selection of a gift option from the updated set of gift options through the physical location, wherein when the gift selection option is selected at the physical location, an indication that the surprise gift object has been delivered is provided.

16. The non-transitory, computer-readable storage medium of claim 15, wherein the set of gift options is provided through a surprise gift object storage device implemented at the physical location, and wherein the availability is associated with the surprise gift object storage device.

17. The non-transitory, computer-readable storage medium of claim 15, wherein the executable instructions further cause the computer system to:

automatically detect a newly unavailable gift option from the set of gift options based on the changes to the initial inventory; and dynamically update the interface to remove a set of interface elements corresponding to the newly unavailable gift option.

18. The non-transitory, computer-readable storage medium of claim 15, wherein the request further defines a range of dates during which the surprise gift object is to be available, and wherein the location data is continuously processed within the range of dates to detect the recipient proximity to the physical location.

19. The non-transitory, computer-readable storage medium of claim 15, wherein the executable instructions further cause the computer system to:

provide an option to convert the surprise gift object to a monetary value, wherein the option is provided through the interface in conjunction with the set of gift options.

20. The non-transitory, computer-readable storage medium of claim 15, wherein the executable instructions further cause the computer system to:

process the identifying information associated with the recipient and a set of surprise gift object parameters through a gift recommendation algorithm to generate a gift option recommendation, wherein the gift recommendation algorithm is trained using a dataset of sample recipient profiles and sample surprise gift object requests; and provide the gift option recommendation; and re-train the gift recommendation algorithm based on the selection of the gift option.

21. The non-transitory, computer-readable storage medium of claim 15, wherein the executable instructions further cause the computer system to:

detect addition of a new gift option available at the physical location, wherein the addition is detected through monitoring of the changes to the initial inventory; and dynamically update the interface to present the new gift option.

* * * * *